US012638294B2

(12) United States Patent
Hong et al.

(10) Patent No.: US 12,638,294 B2
(45) Date of Patent: May 26, 2026

(54) WAREHOUSE LOCATION NUMBERING CONVERSION FOR AERIAL INVENTORY DRONE

(71) Applicant: Brookhurst Garage, Inc., San Jose, CA (US)

(72) Inventors: Soon Hac Hong, San Jose, CA (US); Young Joon Kim, San Jose, CA (US)

(73) Assignee: Brookhurst Garage, Inc., San Jose, CA (US)

( * ) Notice: Subject to any disclaimer, the term of this patent is extended or adjusted under 35 U.S.C. 154(b) by 218 days.

(21) Appl. No.: 18/210,423

(22) Filed: Jun. 15, 2023

(65) Prior Publication Data

US 2024/0418511 A1     Dec. 19, 2024

(51) Int. Cl.
*G01C 21/20*          (2006.01)
*B64U 10/00*          (2023.01)
                    (Continued)

(52) U.S. Cl.
CPC ........... *G01C 21/206* (2013.01); *B64U 10/00* (2023.01); *B64U 2101/30* (2023.01); *B64U 2101/70* (2023.01)

(58) Field of Classification Search
CPC .. G01C 21/206; B64U 10/00; B64U 2101/30; B64U 2101/70
See application file for complete search history.

(56) References Cited

U.S. PATENT DOCUMENTS 2,178,647 A     11/1939  Raymond et al.
9,908,702 B2 *   3/2018  Elazary ................ B65G 1/1375
                    (Continued)

FOREIGN PATENT DOCUMENTS

CN        106527448 A      3/2017
CN        112161618 A      1/2021
                    (Continued)

OTHER PUBLICATIONS

Martinez-Martin E, Ferrer E, Vasilev I, Del Pobil AP. The UJI Aerial Librarian Robot: A Quadcopter for Visual Library Inventory and Book Localisation. Sensors (Basel). Feb. 4, 2021;21(4):1079 (Year: 2021).*

(Continued)

*Primary Examiner* — Joan T Goodbody
(74) *Attorney, Agent, or Firm* — Fenwick & West LLP

(57)          ABSTRACT
A robotic control system may be configured to translate a first set of location coordinates based on a first location numbering system to a second set of location coordinates based on a unified location numbering system. A robotic control system may receive layout data of a warehouse, the layout data containing a plurality of location coordinates of racks and storage locations. The location coordinates may be of a first format based on the first location numbering system that is specific to the warehouse. The robotic control system may analyze the format of the location coordinates to select, from a plurality of candidate conversion algorithms, a suitable conversion algorithm to translate the plurality of location coordinates of the first format to a second format based on the unified numbering system. The robotic control system may store the translated location coordinates for use in generating a topometric map of the warehouse.

20 Claims, 11 Drawing Sheets

(51) Int. Cl.

| | | |
|---|---|---|
| B64U 101/30 | (2023.01) | |
| B64U 101/70 | (2023.01) | |

(56) References Cited

U.S. PATENT DOCUMENTS

| | | | | |
|---|---|---|---|---|
| 10,210,212 | B2 * | 2/2019 | Wang | .................... G05D 1/0212 |
| 2008/0294338 | A1 | 11/2008 | Doh et al. | |
| 2013/0131865 | A1 | 5/2013 | Yamane | |
| 2016/0071278 | A1 | 3/2016 | Leonard et al. | |
| 2017/0225891 | A1 * | 8/2017 | Elazary | ................ G05D 1/0234 |
| 2019/0171220 | A1 | 6/2019 | Elazary et al. | |
| 2020/0047340 | A1 | 2/2020 | Hong | |
| 2020/0380876 | A1 | 12/2020 | Sachdeva et al. | |
| 2022/0011779 | A1 * | 1/2022 | Kim | ........................ G06T 7/277 |
| 2022/0066456 | A1 | 3/2022 | Ebrahimi Afrouzi et al. | |
| 2022/0191542 | A1 | 6/2022 | Ahmadyan et al. | |
| 2022/0351133 | A1 | 11/2022 | Akiona et al. | |
| 2022/0390950 | A1 | 12/2022 | Yamauchi | |
| 2022/0390954 | A1 | 12/2022 | Klingensmith | |

FOREIGN PATENT DOCUMENTS

| | | | | |
|---|---|---|---|---|
| CN | | 115824222 | A | 3/2023 |
| CN | | 116135736 | A | 5/2023 |
| WO | WO 2020/076422 | A2 | | 4/2020 |

OTHER PUBLICATIONS

H. Badino, D. Huber and T. Kanade, "Visual Topometric Localization," Intelligent Vehicles Symposium (IV 2011), Baden-Baden, Germany, 2011. (Year: 2011).*

J. Stanko, F. Stec, L. Palkovic, J. Rodina and D. Rau, "Towards Automatic Inventory Checking Using an Autonomous Unmanned Aerial Vehicle," 2022 IEEE 27th International Conference on Emerging Technologies and Factory Automation (ETFA), Stuttgart, Germany, 2022, pp. 1-8 (Year: 2022).*

PCT International Search Report and Written Opinion, PCT Application No. PCT/US2023/083102, Apr. 2, 2024, 10 pages.

PCT International Search Report and Written Opinion, PCT Application No. PCT/US2024/033136, Sep. 30, 2024, nine pages.

United States Office Action, U.S. Appl. No. 18/088,470, Apr. 24, 2025, 17 pages.

United States Office Action, U.S. Appl. No. 18/088,470, dated Aug. 15, 2025 13 pages.

* cited by examiner

100

Figure 3:
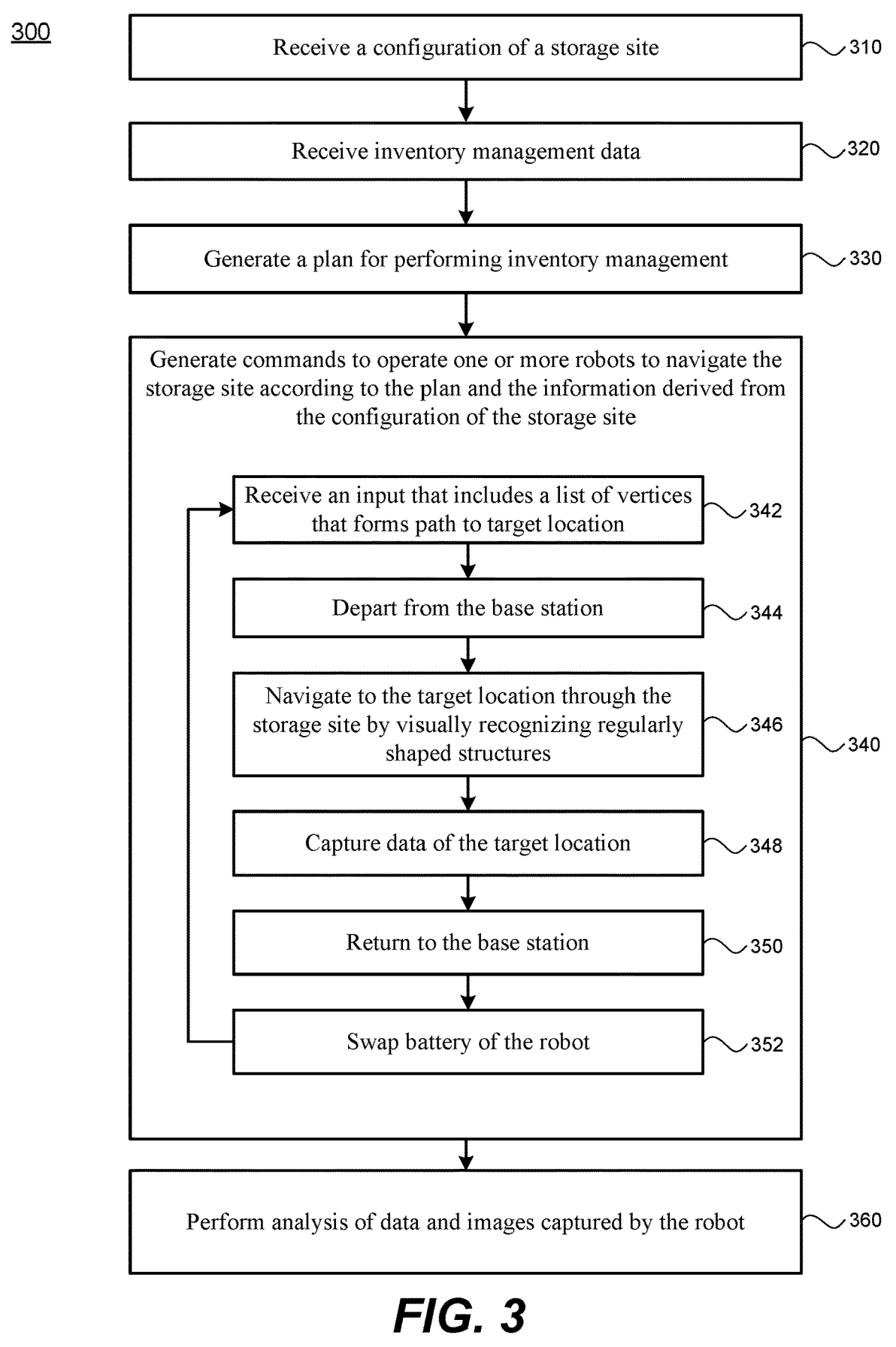

300

| Receive a configuration of a storage site | ~310 |

| Receive inventory management data | ~320 |

| Generate a plan for performing inventory management | ~330 |

Generate commands to operate one or more robots to navigate the storage site according to the plan and the information derived from the configuration of the storage site

| Receive an input that includes a list of vertices that forms path to target location | ~342 |

| Depart from the base station | ~344 |

| Navigate to the target location through the storage site by visually recognizing regularly shaped structures | ~346 |

| Capture data of the target location | ~348 |

| Return to the base station | ~350 |

| Swap battery of the robot | ~352 |

~340

| Perform analysis of data and images captured by the robot | ~360 |

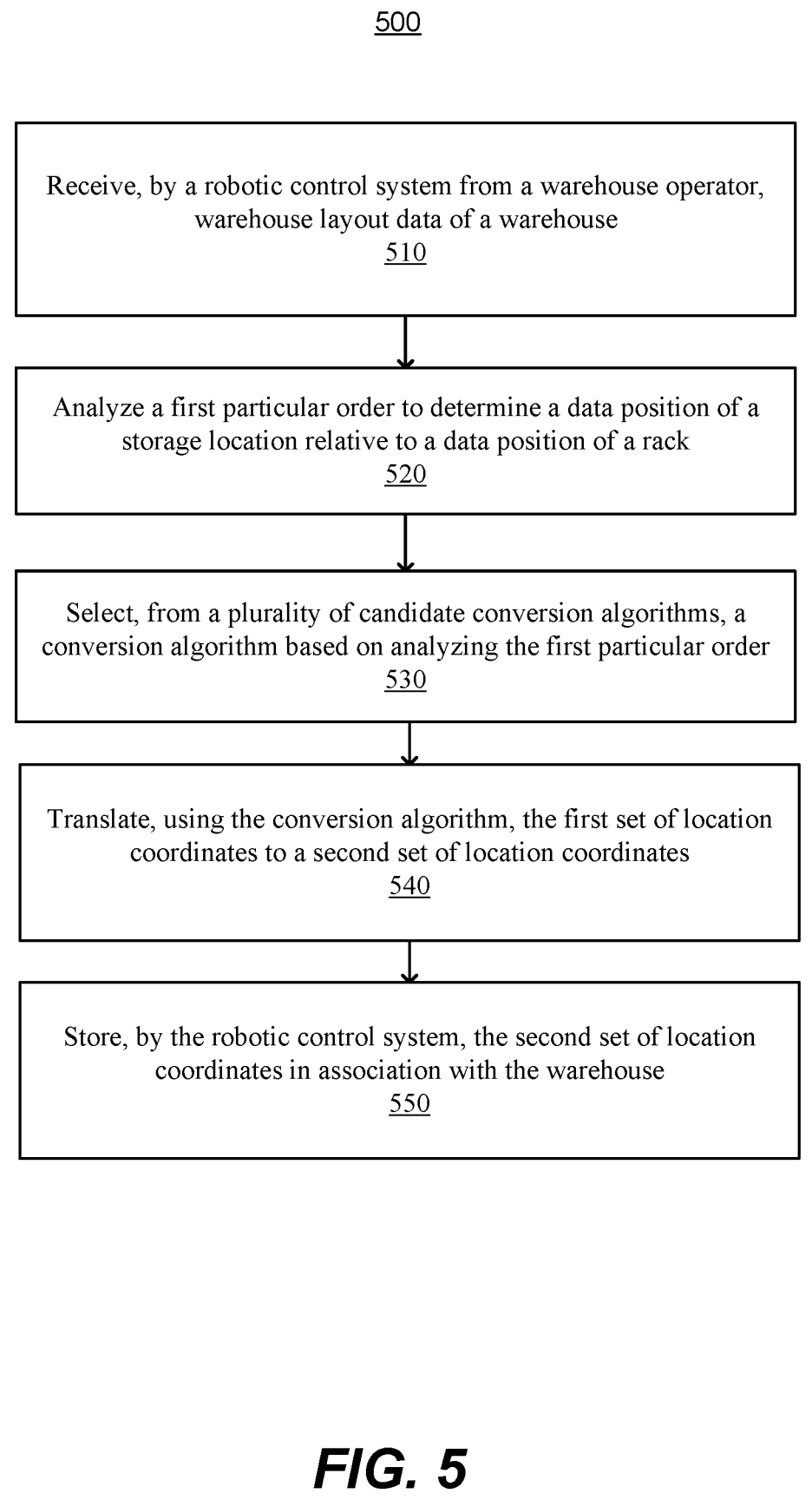

Receive, by a robotic control system from a warehouse operator, warehouse layout data of a warehouse
510

Analyze a first particular order to determine a data position of a storage location relative to a data position of a rack
520

Select, from a plurality of candidate conversion algorithms, a conversion algorithm based on analyzing the first particular order
530

Translate, using the conversion algorithm, the first set of location coordinates to a second set of location coordinates
540

Store, by the robotic control system, the second set of location coordinates in association with the warehouse
550

FIG. 5

Position
624B

Position
624A

Level
622B

Level
622A

Rack
620

Aisle
628

Position
644B

Position
644A

Level
642B

Level
642A

Aisle
640

Position
652B

Position
652A

Rack
650

Position
660B

Position
660A

Rack
658

800

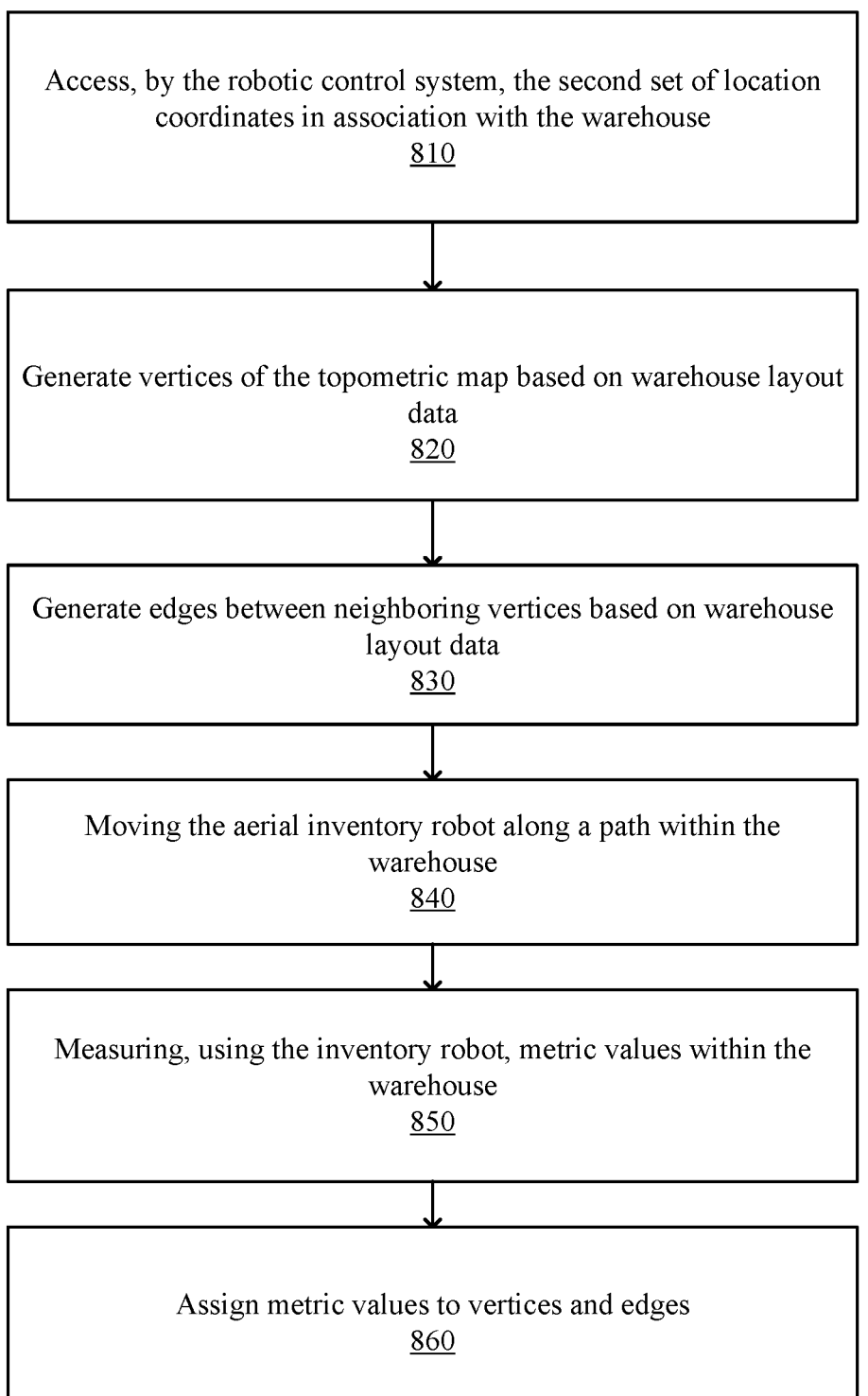

Access, by the robotic control system, the second set of location coordinates in association with the warehouse
810

Generate vertices of the topometric map based on warehouse layout data
820

Generate edges between neighboring vertices based on warehouse layout data
830

Moving the aerial inventory robot along a path within the warehouse
840

Measuring, using the inventory robot, metric values within the warehouse
850

Assign metric values to vertices and edges
860

FIG. 8

WAREHOUSE LOCATION NUMBERING CONVERSION FOR AERIAL INVENTORY DRONE

FIELD

This disclosure relates generally to directing robots in a storage site, and more specifically using a method to translate location coordinates based on various types of warehouse numbering systems to a unified numbering system.

BACKGROUND

In recent years, applications for unmanned aerial vehicles (UAVs) have grown rapidly across numerous industries. Despite its high adoption rate, the deployment of a UAV can still pose several challenges. One such challenge is deploying an inventory robot across different warehouses which may have different physical layouts and use different coordinate systems.

SUMMARY

Embodiments relate to a navigation system based on a topometric map, which uses a unified numbering system, for navigating an inventory robot within a warehouse. The method may include receiving warehouse layout data from a warehouse operator, the warehouse layout data containing a plurality of location coordinates of racks and storage locations. The location coordinates may be of a first format based on a numbering system that is specific to the warehouse. The method may further include analyzing the first format of the location coordinates to select, from a plurality of candidate conversion algorithms, a suitable conversion algorithm to translate the plurality of location coordinates from the first format to a second format based on the unified numbering system. The translated location coordinates may be stored and used to generate a topometric map corresponding to the warehouse. The topometric map may be used for the navigation of an inventory robot within a warehouse.

BRIEF DESCRIPTION OF THE DRAWINGS

FIG.

FIG. 3 is a flowchart that depicts an example process for managing the inventory of a storage site, according to an embodiment.

FIG. 5 is a flowchart illustrating an example translation process from a first location numbering system to the unified numbering system, according to an embodiment.

FIG. 8 is a flowchart illustrating an example process of generating a topometric map, according to an embodiment.

The figures depict, and the detailed description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a method for navigating an inventory robot in a warehouse using a unified numbering system which locates inventory items within a warehouse. The method may include converting a first set of location coordinates based on a first location numbering system used specifically by a warehouse to a second set of location coordinates based on a unified numbering system. The unified numbering system allows any location in a storage site (e.g., warehouse) to be identified by a combination of location characteristics and enables the standardization of different storage site numbering systems, which simplifies the inventory robot deployment process across different storage sites.

A robotic control system may receive the first set of location coordinates from a warehouse operator. The robotic control system may analyze the format of the first set of location coordinates to determine a suitable conversion algorithm, the conversion algorithm configured to convert the first set of location coordinates to a second set of location coordinates based on the unified numbering system. The second set of location coordinates may be a rack-column-row format. The second set of location coordinates may be used by the robotic control system to generate a topometric map, which is used for navigating an inventory robot in a storage site environment. A topometric map may include vertices and edges and may be generated using a warehouse layout data of a warehouse. The vertices may be generated at pallet locations and other structural locations, and edges may be generated between neighboring vertices and represent traversable paths for the inventory robot. The robot may visit vertices to capture images of inventory or for navigation purposes.

System Overview

Figure 1:
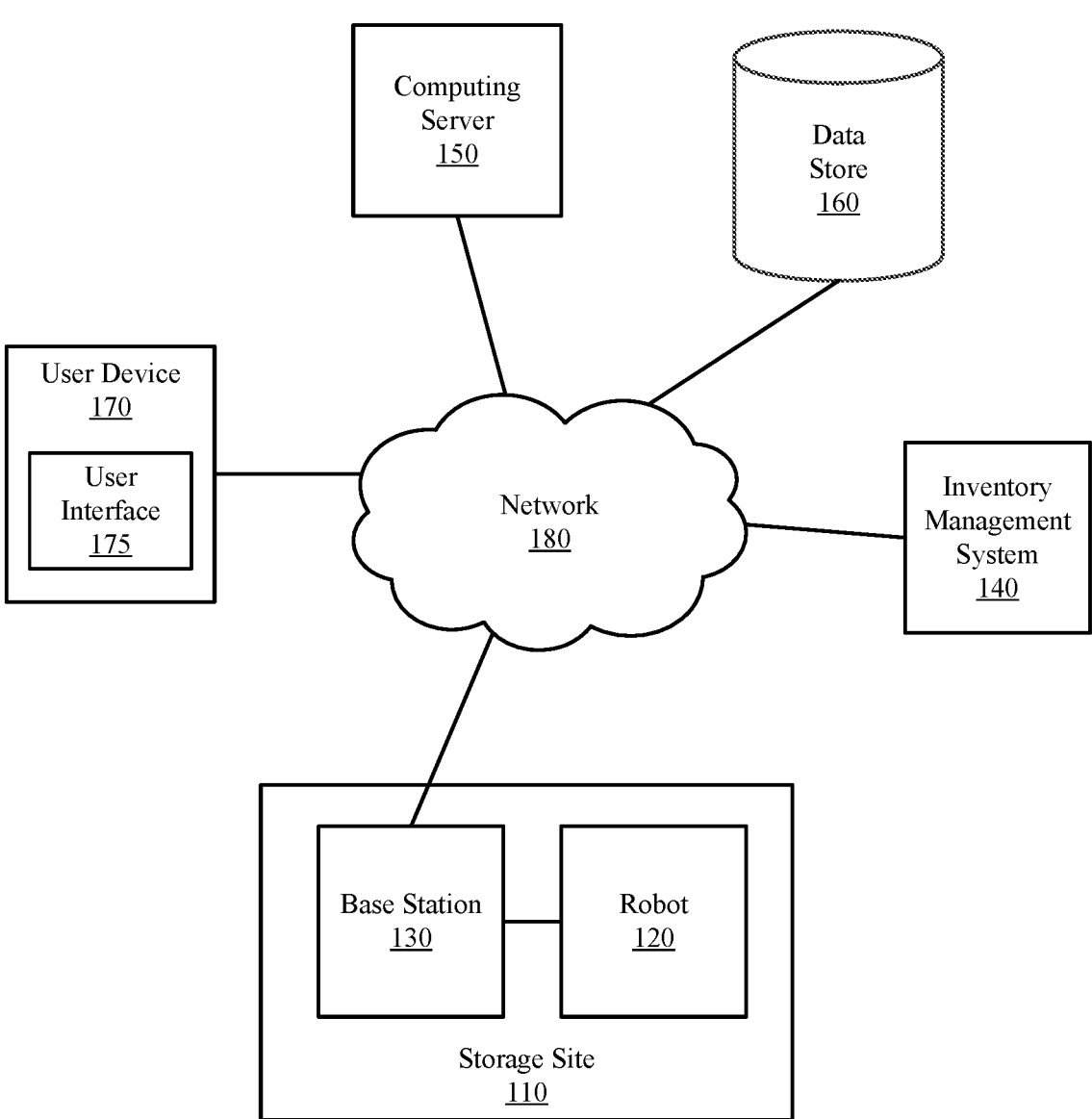
(FIG. 1 is a block diagram that illustrates a system environment of an example storage site, according to an embodiment.

FIG. (FIG. 1 is a block diagram that illustrates a system environment 100 of an example robotically-assisted or fully autonomous storage site, according to an embodiment. By way of example, the system environment 100 includes a storage site 110, a robot 120, a base station 130, an inventory management system 140, a robotic control system 150, a data store 160, and a user device 170. The entities and components in the system environment 100 communicate with each other through the network 180. In various embodiments, the system environment 100 may include different, fewer, or additional components. Also, while each of the components in the system environment 100 is described in a singular form, the system environment 100 may include one or more of each of the components. For example, the storage site 110 may include one or more robots 120 and one or more base stations 130. Each robot 120 may have a corresponding base station 130 or multiple robots 120 may share a base station 130.

A storage site 110 may be any suitable facility that stores, sells, or displays inventories such as goods, merchandise, groceries, articles and collections. Example storage sites 110 may include warehouses, inventory sites, bookstores, shoe stores, outlets, other retail stores, libraries, museums, etc. A storage site 110 may include a number of regularly shaped structures. Regularly shaped structures may be structures, fixtures, equipment, furniture, frames, shells, racks, or other suitable things in the storage site 110 that have a regular shape or outline that can be readily identifiable, whether the things are permanent or temporary, fixed or movable, weight-bearing or not. The regularly shaped structures are often used in a storage site 110 for storage of inventory. For example, racks (including metallic racks, shells, frames, or other similar structures) are often used in a warehouse for the storage of goods and merchandise. However, not all regularly shaped structures may need to be used for inventory storage. A storage site 110 may include a certain layout that allows various items to be placed and stored systematically. For example, in a warehouse, the racks may be grouped by sections and separated by aisles. Each rack may include multiple pallet locations that can be identified using a row number and a column number. A storage site may include high racks and low racks, which may, in some case, largely carry most of the inventory items near the ground level.

A storage site 110 may include one or more robots 120 that are used to keep track of the inventory and to manage the inventory in the storage site 110. For the ease of reference, the robot 120 may be referred to in a singular form, even though more than one robot 120 may be used. Also, in some embodiments, there can be more than one type of robot 120 in a storage site 110. For example, some robots 120 may specialize in scanning inventory in the storage site 110, while other robots 120 may specialize in moving items. A robot 120 may also be referred to as an autonomous robot, an inventory cycle-counting robot, an inventory survey robot, an inventory detection robot, or an inventory management robot. An inventory robot may be used to track inventory items, move inventory items, and carry out other inventory management tasks. The degree of autonomy may vary from embodiments to embodiments. For example, in one embodiment, the robot 120 may be fully autonomous so that the robot 120 automatically performs assigned tasks. In another embodiment, the robot 120 may be semi-autonomous such that it can navigate through the storage site 110 with minimal human commands or controls. In some embodiments, no matter what the degree of autonomy it has, a robot 120 may also be controlled remotely and may be switched to a manual mode. The robot 120 may take various forms such as an aerial drone, a ground robot, a vehicle, a forklift, and a mobile picking robot.

A base station 130 may be a device for the robot 120 to return and, for an aerial robot, to land. The base station 130 may include more than one return site. The base station 130 may be used to repower the robot 120. Various ways to repower the robot 120 may be used in different embodiments. For example, in one embodiment, the base station 130 serves as a battery-swapping station that exchanges batteries on a robot 120 as the robot arrives at the base station to allow the robot 120 to quickly resume duty. The replaced batteries may be charged at the base station 130, wired or wirelessly. In another embodiment, the base station 130 serves as a charging station that has one or more charging terminals to be coupled to the charging terminal of the robot 120 to recharge the batteries of the robot 120. In yet another embodiment, the robot 120 may use fuel for power and the base station 130 may repower the robot 120 by filling its fuel tank.

The base station 130 may also serve as a communication station for the robot 120. For example, for certain types of storage sites 110 such as warehouses, network coverage may not be present or may only be present at certain locations. The base station 130 may communicate with other components in the system environment 100 using wireless or wired communication channels such as Wi-Fi or an Ethernet cable. The robot 120 may communicate with the base station 130 when the robot 120 returns to the base station 130. The base station 130 may send inputs such as commands to the robot 120 and download data captured by the robot 120. In embodiments where multiple robots 120 are used, the base station 130 may be equipped with a swarm control unit or algorithm to coordinate the movements among the robots. The base station 130 and the robot 120 may communicate in any suitable ways such as radio frequency, Bluetooth, near-field communication (NFC), or wired communication. While, in one embodiment, the robot 120 mainly communicates to the base station, in other embodiments the robot 120 may also have the capability to directly communicate with other components in the system environment 100. In one embodiment, the base station 130 may serve as a wireless signal amplifier for the robot 120 to directly communicate with the network 180.

The inventory management system 140 may be a computing system that is operated by the administrator (e.g., a company that owns the inventory, a warehouse management administrator, a retailer selling the inventory) using the storage site 110. The inventory management system 140 may be a system used to manage the inventory items. The inventory management system 140 may include a database that stores data regarding inventory items and the items' associated information, such as quantities in the storage site 110, metadata tags, asset type tags, barcode labels and location coordinates of the items. The inventory management system 140 may provide both front-end and back-end software for the administrator to access a central database and point of reference for the inventory and to analyze data, generate reports, forecast future demands, and manage the locations of the inventory items to ensure items are correctly placed. An administrator may rely on the item coordinate data in the inventory management system 140 to ensure that items are correctly placed in the storage site 110 so that the items can be readily retrieved from a storage location. This prevents an incorrectly placed item from occupying a space that is reserved for an incoming item and also reduces time to locate a missing item at an outbound process.

In some embodiments, warehouse configuration information associated with various warehouses may be stored in the inventory management system 140. The configuration information may include warehouse layout data. The warehouse layout data may include a top-down view of a layout of the storage site 110, which may illustrate the rack layout and placement of other storage structures. The layout may be a 2-dimensional layout. The configuration information may also include location coordinate information of racks and other storage locations in a warehouse.

The robotic control system 150 may be a server that is tasked with analyzing data provided by the robot 120 and provide commands for the robot 120 to perform various inventory recognition and management tasks. The robot 120 may be controlled by the robotic control system 150, the user device 170, or the inventory management system 140. For example, the robotic control system 150 may direct the robot 120 to scan and capture pictures of inventory stored at various locations at the storage site 110. Based on the data provided by the inventory management system 140 and the ground truth data captured by the robot 120, the robotic control system 150 may identify discrepancies in two sets of data and determine whether any items may be misplaced, lost, damaged, or otherwise should be flagged for various reasons. In turn, the robotic control system 150 may direct a robot 120 to remedy any potential issues such as moving a misplaced item to the correct position. In one embodiment, the robotic control system 150 may also generate a report of flagged items to allow site personnel to manually correct the issues.

The robotic control system 150 may include one or more computing devices that operate at different locations. The robotic control system 150 may also be referred to as a "computing server". For example, a part of the robotic control system 150 may be a local server that is located at the storage site 110. The computing hardware such as the processor may be associated with a computer on site or may be included in the base station 130. Another part of the robotic control system 150 may be a cloud server that is geographically distributed. The robotic control system 150 may serve as a ground control station (GCS), provide data processing, and maintain end-user software that may be used in a user device 170. A GCS may be responsible for the control, monitor and maintenance of the robot 120. In one embodiment, GCS is located on-site as part of the base station 130. The data processing pipeline and end-user software server may be located remotely or on-site.

The robotic control system 150 may maintain software applications for users to manage the inventory, the base station 130, and the robot 120. The robotic control system 150 and the inventory management system 140 may or may not be operated by the same entity. In one embodiment, the robotic control system 150 may be operated by an entity separated from the administrator of the storage site. For example, the robotic control system 150 may be operated by a robotic service provider that supplies the robot 120 and related systems to modernize and automate a storage site 110. The software application provided by the robotic control system 150 may take several forms. In one embodiment, the software application may be integrated with or as an add-on to the inventory management system 140. In another embodiment, the software application may be a separate application that supplements or replaces the inventory management system 140. In one embodiment, the software application may be provided as software as a service (SaaS) to the administrator of the storage site 110 by the robotic service provider that supplies the robot 120.

In some embodiments, the robotic control system 150 may include a location numbering converter. In various embodiments, the numbering system converter may be a software module (e.g., code stored on a machine-readable medium). The location numbering conversion system may be configured to convert location coordinates with a first format based on a first numbering system, to a second format based on a unified numbering system.

The data store 160 includes one or more storage units such as memory that takes the form of non-transitory and non-volatile computer storage medium to store various data that may be uploaded by the robot 120 and inventory management system 140. For example, the data stored in data store 160 may include pictures, sensor data, and other data captured by the robot 120. The data may also include inventory data that is maintained by the inventory management system 140. The computer-readable storage medium is a medium that does not include a transitory medium such as a propagating signal or a carrier wave. The data store 160 may take various forms. In one embodiment, the data store 160 communicates with other components by the network 180. This type of data store 160 may be referred to as a cloud storage server. Example cloud storage service providers may include AWS, AZURE STORAGE, GOOGLE CLOUD STORAGE, etc. In another embodiment, instead of a cloud storage server, the data store 160 is a storage device that is controlled and connected to the robotic control system 150. For example, the data store 160 may take the form of memory (e.g., hard drives, flash memories, discs, ROMs, etc.) used by the robotic control system 150 such as storage devices in a storage server room that is operated by the robotic control system 150. In some embodiments, the data store 160 may be used to store warehouse configuration information associated with various warehouses.

The user device 170 may be used by an administrator of the storage site 110 to provide commands to the robot 120 and to manage the inventory in the storage site 110. For example, using the user device 170, the administrator can provide task commands to the robot 120 for the robot to automatically complete the tasks. In one case, the administrator can specify a specific target location or a range of storage locations for the robot 120 to scan. The administrator may also specify a specific item for the robot 120 to locate or to confirm placement. Examples of user devices 170 include personal computers (PCs), desktop computers, laptop computers, tablet computers, smartphones, wearable electronic devices such as smartwatches, or any other suitable electronic devices.

The user device 170 may include a user interface 175, which may take the form of a graphical user interface (GUI). Software application provided by the robotic control system 150 or the inventory management system 140 may be displayed as the user interface 175. The user interface 175 may take different forms. In one embodiment, the user interface 175 is part of a front-end software application that includes a GUI displayed at the user device 170. In one case, the front-end software application is a software application that can be downloaded and installed at user devices 170 via, for example, an application store (e.g., App Store) of the user device 170. In another case, the user interface 175 takes the form of a Web interface of the robotic control system 150 or the inventory management system 140 that allows clients to perform actions through web browsers. In another embodiment, user interface 175 does not include graphical elements but communicates with the robotic control system 150 or the inventory management system 140 via other suitable ways such as command windows or application program interfaces (APIs).

The communications among the robot 120, the base station 130, the inventory management system 140, the robotic control system 150, the data store 160, and the user device 170 may be transmitted via a network 180, for example, via the Internet. In one embodiment, the network 180 uses standard communication technologies and/or protocols. Thus, the network 180 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express, etc. Similarly, the networking protocols used on the network 180 can include multiprotocol label switching (MPLS), the transmission control protocol/Internet protocol (TCP/IP), the user datagram protocol (UDP), the hypertext transport protocol (HTTP), the simple mail transfer protocol (SMTP), the file transfer protocol (FTP), etc. The data exchanged over the network 180 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet protocol security (IPsec), etc. The network 180 also includes links and packet switching networks such as the Internet. In some embodiments, two computing servers, such as robotic control system 150 and inventory management system 140, may communicate through APIs. For example, the robotic control system 150 may retrieve inventory data from the inventory management system 140 via an API.

Example Robot and Base Station

Figure 2:
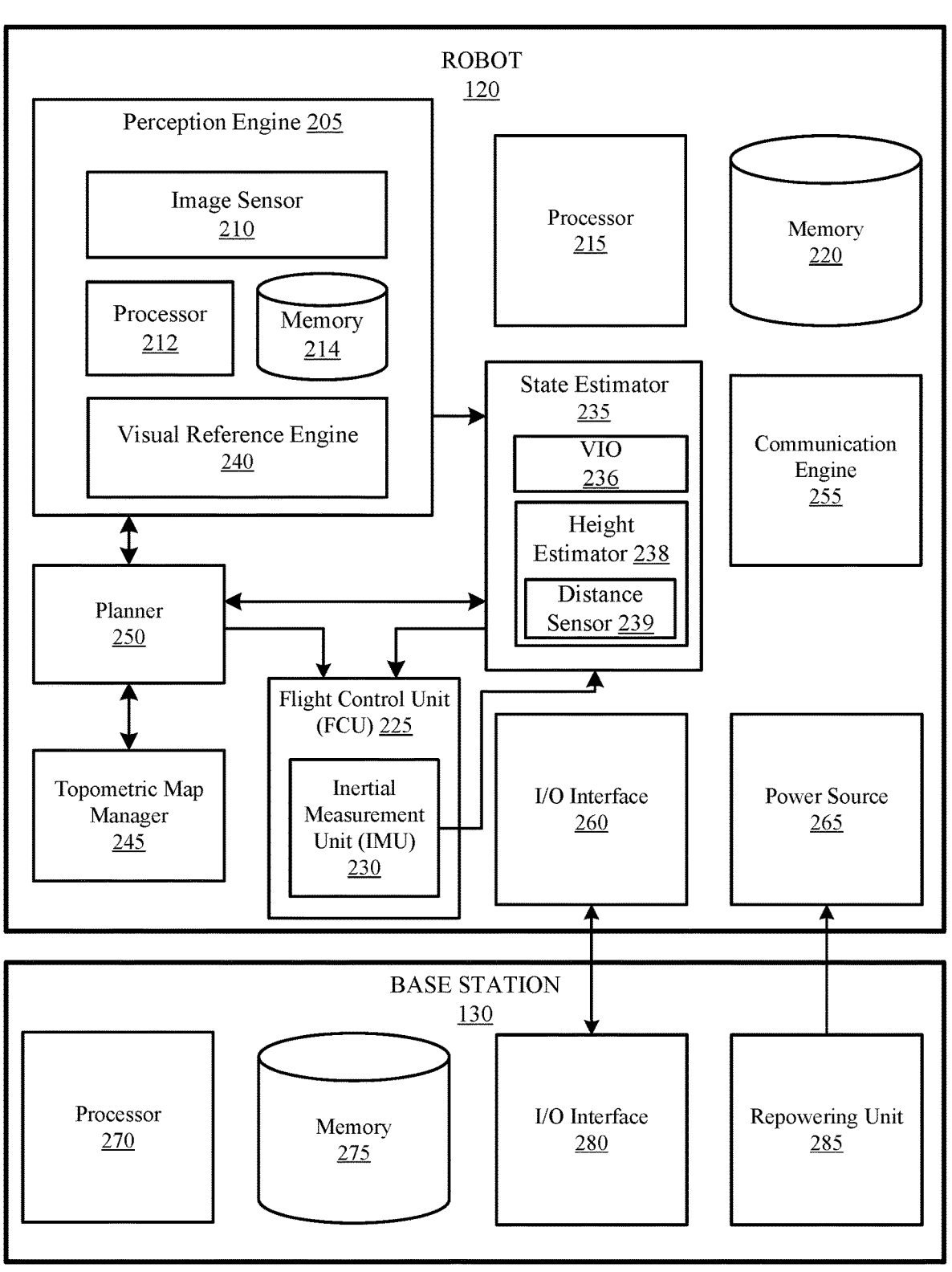
FIG. 2 is a block diagram that illustrates components of an example robot and an example base station, according to an embodiment.

FIG. 2 is a block diagram illustrating components of an example robot 120 and an example base station 130, according to an embodiment. The robot 120 may include a perception engine 205 that includes an image sensor 210 and a visual reference engine 240, a processor 215, memory 220, a flight control unit (FCU) 225 that includes an inertia measurement unit (IMU) 230, a state estimator 235, a topometric map manager 245, a planner 250, a communication engine 255, an I/O interface 260, and a power source 265. The functions of the robot 120 may be distributed among various components in a different manner than described below. In various embodiments, the robot 120 may include different, fewer, and/or additional components. Also, while each of the components in FIG. 2 is described in a singular form, the components may present in plurality. For example, a robot 120 may include more than one image sensor 210 and more than one processor 215.

The perception engine 205 may be a combination of software and hardware, which may include an image sensor 210, its own processor 212, and memory 214 that stores a set of instructions. In various embodiments, the perception engine 205 may include more than one image sensor 210, more than one processor 212 and more than one memory 214. The image sensor 210 may be configured to capture images of an environment of a storage site for navigation, localization, collision avoidance, object recognition and identification, and inventory recognition purposes. The perception engine may include more than one image sensors 210 and more than one type of such image sensors 210. For example, the perception engine 205 may include a digital camera that captures optical images of the environment for the state estimator 235. For example, data captured by the image sensor 210 may also be provided to the VIO unit 236 that may be included in the state estimator 235 for localization purposes such as to determine the position and orientation of the robot 120 with respect to an inertial frame, such as a global frame whose location is known and fixed. The perception engine 205 may also include a stereo camera that includes two or more lenses to allow the image sensor 210 to capture three-dimensional images through stereoscopic photography. For each image frame, the stereo camera may generate pixel values such as in red, green, and blue (RGB) and point cloud data that includes depth information. The images captured by the stereo camera may be provided to visual reference engine 240 for object recognition purposes. The image sensor 210 may also be another type of image sensor such as a light detection and ranging (LIDAR) sensor, an infrared camera, and 360-degree depth cameras. The image sensor 210 may also capture pictures of labels (e.g., barcodes) on items for inventory cycle-counting purposes. In some embodiments, a single stereo camera may be used for various purposes. For example, the stereo camera may provide image data to the visual reference engine 240 for object recognition. The stereo camera may also be used to capture pictures of labels (e.g., barcodes). In some embodiments, the robot 120 includes a rotational mount such as a gimbal that allows the image sensor 210 to rotate in different angles and to stabilize images captured by the image sensor 210. In one embodiment, the image sensor 210 may also capture data along the path for the purpose of mapping the storage site.

The visual reference engine 240 may correspond to a set of software instructions stored in the memory 214 that can be executed by the processor 212. The visual reference engine 240 may include various image processing algorithm and location algorithm to determine the current location of the robot 120, to identify the objects, edges, and surfaces of the environment near the robot 120, and to determine an estimated distance and orientation (e.g., yaw) of the robot 120 relative to a nearby surface of an object. The visual reference engine 240 may receive pixel data of a series of images and point cloud data from the image sensor 210. The location information generated by the visual reference engine 240 may include distance and yaw from an object and center offset from a target point (e.g., a midpoint of a target object).

The visual reference engine 240 may include one or more algorithms and machine learning models to create image segmentations from the images captured by the image sensor 210. The image segmentation may include one or more segments that separate the frames (e.g., vertical or horizontal bars of racks) or outlines of regularly shaped structures appearing in the captured images from other objects and environments. The algorithms used for image segmentation may include a convolutional neural network (CNN). In performing the segmentation, other image segmentation algorithms such as edge detection algorithms (e.g., Canny operator, Laplacian operator, Sobel operator, Prewitt operator), corner detection algorithms, Hough transform, and other suitable feature detection algorithms may also be used.

The visual reference engine 240 also performs object recognition (e.g., object detection and further analyses) and keeps track of the relative movements of the objects across a series of images. The visual reference engine 240 may track the number of regularly shaped structures in the storage site 110 that are passed by the robot 120. For example, the visual reference engine 240 may identify a reference point (e.g., centroid) of a frame of a rack and determine if the reference point passes a certain location of the images across a series of images (e.g., whether the reference point passes the center of the images). If so, the visual reference engine 240 increments the number of regularly shaped structures that have been passed by the robot 120.

The processor 212 may be configured to execute a set of instructions stored in memory 214. The set of instructions, when executed by the processor 212, may cause the processor 212 to carry out processes that instruct the image sensor 210 to capture images of an environment of a storage site, and instruct the visual reference engine 240 to process the captured image data. The memory 214 may also store images and videos captured by the image sensor 210. The perception engine 205 may communicate with the visual reference engine 240 and the state estimator 235 for purposes of navigation, localization, object recognition, collision avoidance, and identification and inventory recognition. For example, the perception engine 205 may take images to measure structural components of the regularly shaped structures found in the storage site. The perception engine 205 receives instructions from the planner 250 to detect a known structure or structural component, such as a rack, a horizontal beam, or an upright beam of a rack. In response, the processor 212 instructs the image sensor 210 to take images of the target structure or structural component, and the data captured by the image sensor 210 is provided to the visual reference engine 240. The visual reference engine 240 may perform various image processing algorithms to identify the structural component in the environment near the robot 120, The state estimator 235 may determine the position and orientation of the robot 120 with respect to an inertial frame, such as a global frame whose location is known and fixed. The captured data is used to measure the structural component and calculate the relative pose of the robot with respect to the structure. Details of how the perception engine 205 may be used by the robot 120 to navigate the storage facility and manage inventory are discussed in FIG. 7 through FIG. 8

The robot 120 includes one or more processors 215 and one or more memories 220 that store one or more sets of instructions. The one or more sets of instructions, when executed by one or more processors, cause the one or more processors to carry out processes that are implemented as one or more software engines. Various components, such as FCU 225 and state estimator 235, of the robot 120 may be implemented as a combination of software and hardware (e.g., sensors). The robot 120 may use a single general processor to execute various software engines or may use separate more specialized processors for different functionalities. In one embodiment, the robot 120 may use a general-purpose computer (e.g., a CPU) that can execute various instruction sets for various components (e.g., FCU 225, visual reference engine 240, state estimator 235, planner 250). The general-purpose computer may run on a suitable operating system such as LINUX, ANDROID, etc. For example, in one embodiment, the robot 120 may carry a smartphone that includes an application used to control the robot. In another embodiment, the robot 120 includes multiple processors that are specialized in different functionalities. For example, some of the functional components such as FCU 225, state estimator 235, and planner 250 may be modularized and each includes its own processor, memory, and a set of instructions. The robot 120 may include a central processor unit (CPU) to coordinate and communicate with each modularized component. Hence, depending on embodiments, a robot 120 may include a single processor or multiple processors 215 to carry out various operations. The memory 220 may also store images and videos captured by the image sensor 210 from the perception engine 205. The images may include images that capture the surrounding environment and images of the inventory such as barcodes and labels.

The flight control unit (FCU) 225 may be a combination of software and hardware, such as inertial measurement unit (IMU) 230 and other sensors, to control the movement of the robot 120. For ground robot 120, the flight control unit 225 may also be referred to as a microcontroller unit (MCU). The FCU 225 relies on information provided by other components to control the movement of the robot 120. For example, the planner 250 determines the path of the robot 120 from a starting point to a destination and provides commands to the FCU 225. Based on the commands, the FCU 225 generates electrical signals to various mechanical parts (e.g., actuators, motors, engines, wheels) of the robot 120 to adjust the movement of the robot 120. The precise mechanical parts of the robots 120 may depend on the embodiments and the types of robots 120.

The IMU 230 may be part of the FCU 225 or may be an independent component. The IMU 230 may include one or more accelerometers, gyroscopes, and other suitable sensors to generate measurements of forces, linear accelerations, and rotations of the robot 120. For example, the accelerometers measure the force exerted on the robot 120 and detect the linear acceleration. Multiple accelerometers cooperate to detect the acceleration of the robot 120 in the three-dimensional space. For instance, a first accelerometer detects the acceleration in the x-direction, a second accelerometer detects the acceleration in the y-direction, and a third accelerometer detects the acceleration in the z-direction. The gyroscopes detect the rotations and angular velocity of the robot 120. Based on the measurements, a processor 215 may obtain the estimated localization of the robot 120 by integrating the translation and rotation data of the IMU 230 with respect to time. The IMU 230 may also measure the orientation of the robot 120. For example, the gyroscopes in the IMU 230 may provide readings of the pitch angle, the roll angle, and the yaw angle of the robot 120.

The state estimator 235 may correspond to a set of software instructions stored in the memory 220 that can be executed by the processor 215. The state estimator 235 may be used to generate localization information of the robot 120 and may include various sub-components for estimating the state of the robot 120. For example, in one embodiment, the state estimator 235 may include a visual-inertial odometry (VIO) unit 236 and a height estimator 238. In other embodiments, other modules, sensors, and algorithms may also be used in the state estimator 235 to determine the location of the robot 120.

The VIO unit 236 receives image data from the image sensor 210 (e.g., a stereo camera) and measurements from IMU 230 to generate localization information such as the position and orientation of the robot 120. The localization data obtained from the double integration of the acceleration measurements from the IMU 230 is often prone to drift errors. The VIO unit 236 may extract image feature points and tracks the feature points in the image sequence to generate optical flow vectors that represent the movement of edges, boundaries, surfaces of objects in the environment captured by the image sensor 210. Various signal processing techniques such as filtering (e.g., Wiener filter, Kalman filter, bandpass filter, particle filter) and optimization, and data/image transformation may be used to reduce various errors in determining localization information. The localization data generated by the VIO unit 236 may include an estimate of the pose of the robot 120, which may be expressed in terms of the 3D position (x,y,z), the roll angle, the pitch angle, and the yaw angle of the robot 120.

The height estimator 238 may be a combination of software and hardware that are used to determine the absolute height and relative height (e.g., distance from an object that lies on the floor) of the robot 120. The height estimator 238 may include a downward distance sensor 239 that may measure the height relative to the ground or to an object underneath the robot 120. The distance sensor 239 may be electromagnetic wave based, laser based, optics based, sonar based, ultrasonic based, or another suitable signal based. For example, the distance sensor 239 may be a laser range finder, a lidar range finder, a sonar range finder, an ultrasonic range finder, or a radar. A range finder may include one or more emitters that emit signals (e.g., infrared, laser, sonar, etc.) and one or more sensors that detect the round trip time of the signal reflected by an object. In some embodiments, the robot 120 may be equipped with a single emitter range finder. The height estimator 238 may also receive data from the VIO unit 236 that may estimate the height of the robot 120, but usually in a less accurate fashion compared to a distance sensor 239. The height estimator 238 may include software algorithms to combine data generated by the distance sensor 239 and the data generated by the VIO unit 236 as the robot 120 flies over various objects and inventory that are placed on the floor or other horizontal levels. The data generated by the height estimator 238 may be used for collision avoidance and finding a target location. The height estimator 238 may set a global maximum altitude to prevent the robot 120 from hitting the ceiling. The height estimator 238 also provides information regarding how many rows in the rack are below the robot 120 for the robot 120 to locate a target location. The height data may be used in conjunction with the count of rows that the robot 120 has passed to determine the vertical level of the robot 120.

The robot 120 may use various components to generate various types of location information (including location information relative to nearby objects and localization information). For example, in one embodiment, the state estimator 235 may process the data from the VIO unit 236 and the height estimator 238 to provide localization information to the planner 250. The visual reference engine 240 may count the number of regularly shaped structures that the robot 120 has passed to determine a current location. The visual reference engine 240 may generate location information relative to nearby objects. For example, when the robot 120 reaches a target location of a rack, the visual reference engine 240 may use point cloud data to reconstruct a surface of the rack and use the depth data from the point cloud to determine more accurate yaw and distance between the robot 120 and the rack. The visual reference engine 240 may determine a center offset, which may correspond to the distance between the robot 120 and the center of a target location (e.g., the midpoint of a target location of a rack). Using the center offset information, the planner 250 controls the robot 120 to move to the target location and take a picture of the inventory in the target location. When the robot 120 changes direction (e.g., rotations, transitions from horizontal movement to vertical movement, transitions from vertical movement to horizontal movement, etc.), the center offset information may be used to determine the accurate location of the robot 120 relative to an object.

The topometric map manager 245 may correspond to a set of software instructions stored in the memory 220 that can be executed by the processor 215. The topometric map manager 245 may include algorithm that generate and manage one or more topometric maps stored in the memory 220. A topometric map may correspond to the topology of the storage site 110 and may include metrics that measure precise dimensions of different components in the topology. The topometric map manager 245 may download an initial version of the topometric map that is provided by robotic control system 150 and direct the robot 120 to survey the storage site 110 to measure or verify the metric values at various locations of the storage site 110. Details of example topometric maps and how they may be generated are discussed in FIG. 7 through FIG. 9. An example of a method for generating a topometric map and how it is used by the robot to navigate a storage site is disclosed in U.S. patent application Ser. No. 18/088,470, entitled "Topometric Map Based Autonomous Navigation for Inventory Drone", filed on Dec. 23, 2022, and is incorporated by reference herein for all purposes.

The planner 250 may correspond to a set of software instructions stored in the memory 220 that can be executed by the processor 215. The planner 250 may request the Topometric Map Manager 245 which includes various routing algorithms to plan a path of the robot 120 as the robot travels from a first location (e.g., a starting location, the current location of the robot 120 after finishing the previous journey) to a second location (e.g., a target destination). The robot 120 may receive inputs such as user commands to perform certain actions (e.g., scanning of inventory, moving an item, etc.) at certain locations. The planner 250 may include two types of routes, which corresponds to a spot check and a range scan. In a spot check, the planner 250 may receive an input that includes coordinates of one or more specific target locations. In response, the planner 250 plans a path for the robot 120 to travel to the target locations to perform an action. In a range scan, the input may include a range of coordinates corresponding to a range of target locations. In response, the planner 250 plans a path for the robot 120 to perform a full scan or actions for the range of target locations. Whether the robot 120 is performing a spot check or a range scan, the planner 250 may use a topometric map to determine the path to complete the action.

The planner 250 may plan the route of the robot 120 based on data provided by the visual reference engine 240 and the data provided by the state estimator 235. For example, the visual reference engine 240 estimates the current location of the robot 120 by tracking the number of regularly shaped structures in the storage site 110 passed by the robot 120. Based on the location information provided by the visual reference engine 240, the planner 250 determines the route of the robot 120 and may adjust the movement of the robot 120 as the robot 120 travels along the route.

The planner 250 may also include a fail-safe mechanism in the case where the movement of the robot 120 has deviated from the plan. For example, if the planner 250 determines that the robot 120 has passed a target aisle and traveled too far away from the target aisle, the planner 250 may send signals to the FCU 225 to try to remedy the path. If the error is not remedied after a timeout or within a reasonable distance, or the planner 250 is unable to correctly determine the current location, the planner 250 may direct the FCU to land or to stop the robot 120.

Relying on various location information, the planner 250 may also include algorithms for collision avoidance purposes. In one embodiment, the planner 250 relies on the distance information, the yaw angle, and center offset information relative to nearby objects to plan the movement of the robot 120 to provide sufficient clearance between the robot 120 and nearby objects. Alternatively, or additionally, the robot 120 may include one or more depth cameras such as a 360-degree depth camera set that generates distance data between the robot 120 and nearby objects. The planner 250 uses the location information from the depth cameras to perform collision avoidance.

The communication engine 255 and the I/O interface 260 are communication components to allow the robot 120 to communicate with other components in the system environment 100. A robot 120 may use different communication protocols, wireless or wired, to communicate with an external component such as the base station 130. Example communication protocols may include Wi-Fi, Bluetooth, NFC, USB, etc. that couple the robot 120 to the base station 130. The robot 120 may transmit various types of data, such as image data, flight logs, location data, inventory data, and robot status information. The robot 120 may also receive inputs from an external source to specify the actions that need to be performed by the robot 120. The commands may be automatically generated or manually generated by an administrator. The communication engine 255 may include algorithms for various communication protocols and standards, encoding, decoding, multiplexing, traffic control, data encryption, etc. for various communication processes. The I/O interface 260 may include software and hardware component such as hardware interface, antenna, and so forth for communication.

The robot 120 also includes a power source 265 used to power various components and the movement of the robot 120. The power source 265 may be one or more batteries or a fuel tank. Example batteries may include lithium-ion batteries, lithium polymer (LiPo) batteries, fuel cells, and other suitable battery types. The batteries may be placed inside permanently or may be easily replaced. For example, batteries may be detachable so that the batteries may be swapped when the robot 120 returns to the base station 130.

While FIG. 2 illustrates various example components, a robot 120 may include additional components. For example, some mechanical features and components of the robot 120 are not shown in FIG. 2. Depending on its type, the robot 120 may include various types of motors, actuators, robotic arms, lifts, other movable components, other sensors for performing various tasks.

Continuing to refer to FIG. 2, an example base station 130 includes a processor 270, a memory 275, an I/O interface 280, and a repowering unit 285. In various embodiments, the base station 130 may include different, fewer, and/or additional components.

The base station 130 includes one or more processors 270 and one or more memories 275 that include one or more set of instructions for causing the processors 270 to carry out various processes that are implemented as one or more software modules. The base station 130 may provide inputs and commands to the robot 120 for performing various inventory management tasks. The base station 130 may also include an instruction set for performing swarm control among multiple robots 120. Swarm control may include task allocation, routing and planning, coordination of movements among the robots to avoid collisions, etc. The base station

130 may serve as a central control unit to coordinate the robots 120. The memory 275 may also include various sets of instructions for performing analysis of data and images downloaded from a robot 120. The base station 130 may provide various degrees of data processing from raw data format conversion to a full data processing that generates useful information for inventory management. Alternatively, or additionally, the base station 130 may directly upload the data downloaded from the robot 120 to a data store, such as the data store 160. The base station 130 may also provide operation, administration, and management commands to the robot 120. In one embodiment, the base station 130 can be controlled remotely by the user device 170, the robotic control system 150, or the inventory management system 140.

The base station 130 may also include various types of I/O interfaces 280 for communications with the robot 120 and to the Internet. The base station 130 may communicate with the robot 120 continuously using a wireless protocol such as Wi-Fi or Bluetooth. In one embodiment, one or more components of the robot 120 in FIG. 2 may be located in the base station and the base station may provide commands to the robot 120 for movement and navigation. Alternatively, or additionally, the base station 130 may also communicate with the robot 120 via short-range communication protocols such as NFC or wired connections when the robot 120 lands or stops at the base station 130. The base station 130 may be connected to the network 180 such as the Internet. The wireless network (e.g., LAN) in some storage sites 110 may not have sufficient coverage. The base station 130 may be connected to the network 180 via an Ethernet cable.

The repowering unit 285 includes components that are used to detect the power level of the robot 120 and to repower the robot 120. Repowering may be done by swapping the batteries, recharging the batteries, re-filling the fuel tank, etc. In one embodiment, the base station 130 includes mechanical actuators such as robotic arms to swap the batteries on the robot 120. In another embodiment, the base station 130 may serve as the charging station for the robot 120 through wired charging or inductive charging. For example, the base station 130 may include a landing or resting pad that has an inductive coil underneath for wirelessly charging the robot 120 through the inductive coil in the robot. Other suitable ways to repower the robot 120 is also possible.

Example Inventory Management Process

FIG. 3 is a flowchart that depicts an example process for managing the inventory of a storage site, according to an embodiment. The process may be implemented by a computer, which may be a single operation unit in a conventional sense (e.g., a single personal computer) or may be a set of distributed computing devices that cooperate to execute a set of instructions (e.g., a virtual machine, a distributed computing system, cloud computing, etc.). Also, while the computer is described in a singular form, the computer that performs the process in FIG. 3 may include more than one computer that is associated with the robotic control system 150, the inventory management system 140, the robot 120, the base station 130, or the user device 170.

According to an embodiment, the computer receives 310 a configuration of a storage site 110. The storage site 110 may be a warehouse, a retail store, or another suitable site. The configuration information of the storage site 110 may be uploaded to the robot 120 for the robot to navigate through the storage site 110. The configuration information may include a total number of the regularly shaped structures in the storage site 110 and dimension information of the regularly shaped structures. The configuration information provided may take the form of a computer-aided design (CAD) drawing or another type of file format. The configuration may include the layout of the storage site 110, such as the rack layout and placement of other regularly shaped structures. The layout may be a 2-dimensional layout. The computer extracts the number of sections, aisles, and racks and the number of rows and columns for each rack from the CAD drawing by counting those numbers as appeared in the CAD drawing. The computer may also extract the height and the width of the cells of the racks from the CAD drawing or from another source. In one embodiment, the computer does not need to extract the accurate distances between a given pair of racks, the width of each aisle, or the total length of the racks. Instead, the robot 120 may measure dimensions of aisles, racks, and cells from a depth sensor data or may use a counting method performed by the planner 250 in conjunction with the visual reference engine 240 to navigate through the storage site 110 by counting the number of rows and columns the robot 120 has passed. Hence, in some embodiments, the accurate dimensions of the racks may not be needed. An example of a method for measuring and counting the structures in the storage site is disclosed in U.S. patent application Ser. No. 16/925,241, entitled "Autonomous Robotic Navigation in Storage Site", filed on Jul. 9, 2020, and is incorporated by reference herein for all purposes.

Some configuration information may also be manually inputted by an administrator of the storage site 110. For example, the administrator may provide the number of sections, the number of aisles and racks in each section, and the size of the cells of the racks. The administrator may also input the number of rows and columns of each rack.

Alternatively, or additionally, the configuration information may also be obtained through a mapping process such as a pre-flight mapping or a mapping process that is conducted as the robot 120 carries out an inventory management task. For example, for a storage site 110 that newly implements the automated management process, an administrator may provide the size of the navigable space of the storage site for one or more mapping robots to count the numbers of sections, aisles, rows and columns of the regularly shaped structures in the storage site 110. Again, in one embodiment, the mapping or the configuration information does not need to measure the accurate distance among racks or other structures in the storage site 110. Instead, a robot 120 may navigate through the storage site 110 with only a rough layout of the storage site 110 by counting the regularly shaped structures along the path in order to identify a target location. The robotic system may gradually perform mapping or estimation of scales of various structures and locations as the robot 120 continues to perform various inventory management tasks.

The computer receives 320 inventory management data for inventory management operations at the storage site 110. Certain inventory management data may be manually inputted by an administrator while other data may be downloaded from the inventory management system 140. The inventory management data may include scheduling and planning for inventory management operations, including the frequency of the operations, time window, etc. For example, the management data may specify that each location of the racks in the storage site 110 is to be scanned every predetermined period (e.g., every day) and the inventory scanning process is to be performed in the evening by the robot 120 after the storage site is closed. The data in the inventory management system 140 may provide the barcodes and labels of items, the correct coordinates of the inventory, information regarding racks and other storage spaces that need to be vacant for incoming inventory, etc. The inventory management data may also include items that need to be retrieved from the storage site 110 (e.g., items on purchase orders that need to be shipped) for each day so that the robot 120 may need to focus on those items.

The computer generates 330 a plan for performing inventory management. For example, the computer may generate an automatic plan that includes various commands to direct the robot 120 to perform various scans. The commands may specify a range of locations that the robot 120 needs to scan or one or more specific locations that the robot 120 needs to go. The computer may estimate the time for each scanning trip and design the plan for each operation interval based on the available time for the robotic inventory management. For example, in certain storage sites 110, robotic inventory management is not performed during the business hours.

The computer generates 340 various commands to operate one or more robots 120 to navigate the storage site 110 according to the plan and the information derived from the configuration of the storage site 110. The robot 120 may navigate the storage site 110 by at least visually recognizing the regularly shaped structures in the storage sites and counting the number of regularly shaped structures. In one embodiment, in addition to the localization techniques such as VIO used, the robot 120 counts the number of racks, the number of rows, and the number of columns that it has passed to determine its current location along a path from a starting location to a target location without knowing the accurate distance and direction that it has traveled.

The scanning of inventory or other inventory management tasks may be performed autonomously by the robot 120. In one embodiment, a scanning task begins at a base station at which the robot 120 receives 342 an input that includes coordinates of target locations in the storage site 110 or a range of target locations. The robot 120 departs 344 from the base station 130. The robot 120 navigates 346 through the storage site 110 by visually recognizing regularly shaped structures. For example, the robot 120 tracks the number of regularly shaped structures that are passed by the robot 120. The robot 120 makes turns and translation movements based on the recognized regularly shaped structures captured by the robot's image sensor 210. Upon reaching the target location, the robot 120 may align itself with a reference point (e.g., the center location) of the target location. At the target location, the robot 120 captures 348 data (e.g., measurements, pictures, etc.) of the target location that may include the inventory item, barcodes, and labels on the boxes of the inventory item. If the initial command before the departure of the robot 120 includes multiple target locations or a range of target locations, the robot 120 continues to the next target locations by moving up, down, or sideways to the next location to continue to scanning operation.

Upon completion of a scanning trip, the robot 120 returns to the base station 130 by counting the number of regularly shaped structures that the robot 120 has passed, in a reversed direction. The robot 120 may potentially recognize the structures that the robot has passed when the robot 120 travels to the target location. Alternatively, the robot 120 may also return to the base station 130 by reversing the path without any count. The base station 130 repowers the robot 120. For example, the base station 130 provides the next commands for the robot 120 and swaps 352 the battery of the robot 120 so that the robot 120 can quickly return to service for another scanning trip. The used batteries may be charged at the base station 130. The base station 130 also may download the data and images captured by the robot 120 and upload the data and images to the data store 160 for further process. Alternatively, the robot 120 may include a wireless communication component to send its data and images to the base station 130 or directly to the network 180.

The computer performs 360 analyses of the data and images captured by the robot 120. For example, the computer may compare the barcodes (including serial numbers) in the images captured by the robot 120 to the data stored in the inventory management system 140 to identify if any items are misplaced or missing in the storage site 110. The computer may also determine other conditions of the inventory. The computer may generate a report to display at the user interface 175 for the administrator to take remedial actions for misplaced or missing inventory. For example, the report may be generated daily for the personnel in the storage site 110 to manually locate and move the misplaced items. Alternatively, or additionally, the computer may generate an automated plan for the robot 120 to move the misplaced inventory. The data and images captured by the robot 120 may also be used to confirm the removal or arrival of inventory items.

Figure 4:
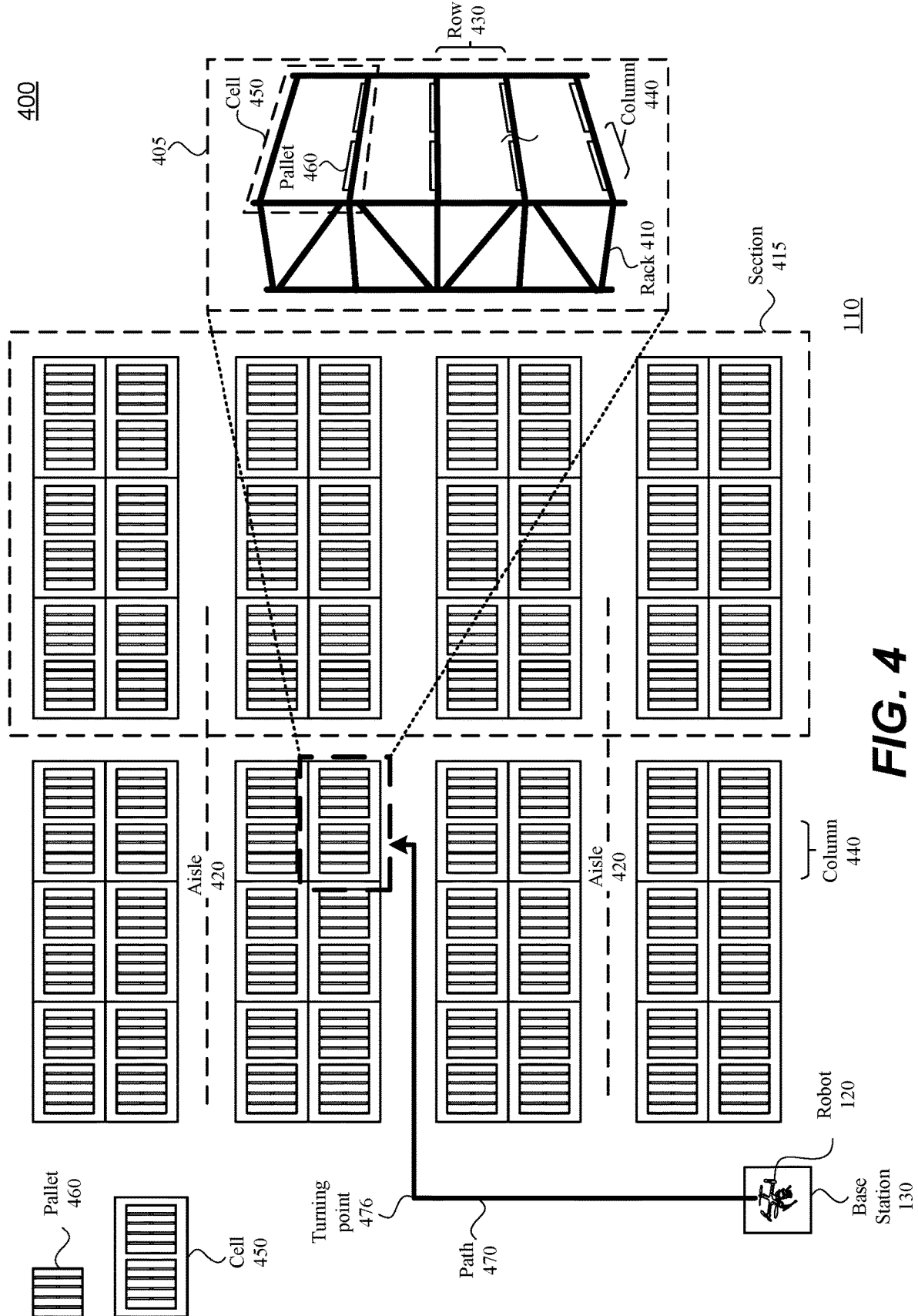
FIG. 4 is a conceptual diagram of an example layout of a storage site that is equipped with a robot, according to an embodiment.

FIG. 4 is a conceptual diagram of an example layout of a storage site 110 that is equipped with a robot 120, according to an embodiment. FIG. 4 shows a two-dimensional layout of storage site 110 with an enlarged view of an example rack that is shown in inset 405. The storage site 110 may be divided into different regions based on the regularly shaped structures. In this example, the regularly shaped structures are racks 410. The storage site 110 may be divided by sections 415, aisles 420, rows 430 and columns 440. For example, a section 415 is a group of racks. Each aisle may have two sides of racks. Each rack 410 may include one or more columns 440 and multiple rows 430. The storage unit of a rack 410 may be referred to as a cell 450. Each cell 450 may carry one or more pallets 460. In this particular example, two pallets 460 are placed on each cell 450. Inventory of the storage site 110 is carried on the pallets 460. The divisions and nomenclature illustrated in FIG. 4 are used as examples only. A storage site 110 in another embodiment may be divided in a different manner.

Each inventory item in the storage site 110 may be located on a pallet 460. The target location (e.g., a pallet location) of the inventory item may be identified using a coordinate system. For example, an item placed on a pallet 460 may have an aisle number (A), a rack number (K), a row number (R), and a column number (C). For example, a pallet location coordinate of [A3, K1, R4, and C5] means that the pallet 460 is located at a rack 410 in the third aisle and the north rack. The location of the pallet 460 in the rack 410 is in the fourth row (counting from the ground) and the fifth column. In some cases, such as the particular layout shown in FIG. 4, an aisle 420 may include racks 410 on both sides. Additional coordinate information may be used to distinguish the racks 410 at the north side and the racks 410 at the south side of an aisle 420. Alternatively, the top and bottom sides of the racks can have different aisle numbers. For a spot check, a robot 120 may be provided with a single coordinate if only one spot is provided or multiple coordinates if more than one spot is provided. For a range scan that checks a range of pallets 460, the robot 120 may be provided with a range of coordinates, such as an aisle number, a rack number, a starting row, a starting column, an ending row, and an ending column. In some embodiments, the coordinate of a pallet location may also be referred in a different manner.

For example, in one case, the coordinate system may take the form of "aisle-rack-shelf-position." The shelf number may correspond to the row number and the position number may correspond to the column number.

Example Conversion Process

FIG. 5 is a flowchart illustrating an example translation process from a first location numbering system to the unified numbering system, according to an embodiment. The robotic control system 150 may receive 510, from a warehouse operator, warehouse layout data of a warehouse. In some embodiments, the warehouse operator may include one or more individuals who manage the day-to-day operations of the warehouse, a company that owns the inventory, or a retailer selling the inventory. The warehouse operator may use software provided by the robotic control system 150 to manage the inventory, the base station 130, and the robot 120. The warehouse operator may upload warehouse layout data of a warehouse to the robotic control system 150 through a user interface 175 on a user device 170. As described in FIG. 3, the warehouse configuration information includes warehouse layout data, such as the layout of the storage site 110 (e.g., top-down view of warehouse), rack layout and placement of other storage locations. The warehouse layout data may include a total number of racks and storage structures in the storage site 110 and dimension information of the racks and storage structures.

The warehouse layout data may further include a first set of location coordinates indicating the locations of pallets, racks, or other storage structures in the warehouse, the first set of location coordinates having a first format based on a location numbering system used by the warehouse. The robotic control system 150 may be configured to process location coordinates with different formats based on different location numbering systems, each numbering system corresponding to a different coordinate system. Some examples of warehouse location numbering systems include a rack-bay-level-position numbering system, aisle-section-level-position or aisle-rack-level-position numbering system, aisle-position-level numbering system, rack-position numbering system, and position numbering system. The first set of location coordinates are arranged in a first particular order according to the employed numbering system. For example, a location coordinate formatted based on the rack-bay-level-position numbering system may be ordered in the sequence as indicated by the name of the numbering system. As such, the location coordinate may be presented as "1-2-A-3", which indicates a storage location (e.g., pallet location) located at a level "A" of a rack "1", at position "3" in a bay "2". In another example, a location coordinate formatted based on the rack-position numbering system may be ordered accordingly and presented as "A-006". This location coordinate indicates a storage location located at a rack "A" in position "6".

The robotic control system 150 may provide the first set of location coordinates to the numbering system converter. The numbering system converter may analyze 520 the first particular order of the location coordinate to determine a data position of a storage location relative to a data position of a rack. The numbering system may determine the arrangement of the coordinate system based on the order of the location coordinate. For example, a location coordinate represented as "1-3-B-1" can be identified, based on warehouse layout data and the order of the coordinate values of the location coordinate, as having a rack-bay-level-position format. Similarly, a location coordinate represented as "2-Right-3-7" can be identified as having an aisle-section-level-position format, and can be contrasted with the previous example based on the coordinate values.

The numbering system converter may select 530, from a plurality of candidate conversion algorithms, a conversion algorithm based on analyzing the first particular order of the location coordinates. Each of the plurality of candidate conversion algorithms may be configured to convert location coordinates formatted based on a particular numbering system to a format based on the unified numbering system. The unified numbering system may have a rack-column-row format. For example, the numbering system converter may determine that a first set of location coordinates has a rack-bay-level-position format. The numbering system converter may select a corresponding conversion algorithm to translate the first set of location coordinates to a rack-column-row format.

The numbering system converter may translate 540, using the conversion algorithm, the first set of location coordinates to a second set of location coordinates. The numbering system converter may provide the first set of location coordinates to the conversion algorithm. For each location coordinate in the first set, the conversion algorithm may convert the location coordinate to a location coordinate with a second format (e.g., rack-column-row) based on the unified numbering system. Example conversion algorithms are further discussed in further detail below in FIGS. 6A through 6F.

The robotic control system 150 may receive the second set of location coordinates from the numbering system converter. The robotic control system 150 stores 550 the second set of location coordinates in association with the warehouse. In some embodiments, the robotic control system 150 stores the second set of location coordinates in the data store. In other embodiments, the robotic control system may store the second location coordinates in the inventory management system 140. The second set of locations coordinates may be used to generate a topometric map, which is used to navigate the aerial inventory robot within the warehouse. The topometric map is discussed in further detail below in FIG. 7.

Example Conversion Algorithms

Figure 6A:
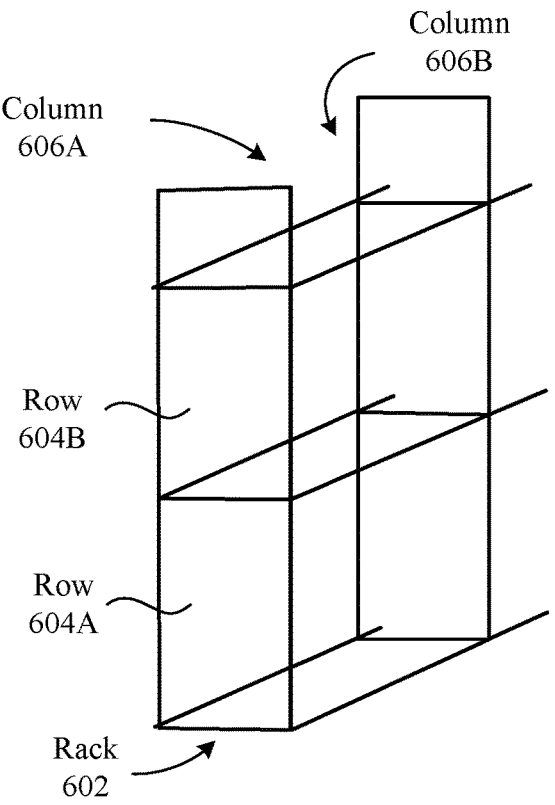
FIG. 6A is a conceptual diagram illustrating a rack structure labeled according to a unified location numbering system, according to an embodiment.

FIG. 6A is a conceptual diagram illustrating a rack structure labeled according to a unified location numbering system, according to an embodiment. The unified numbering system allows a pallet location in a storage site to be identified by a combination of location characteristics such as a rack number, column number, and row number. As such, the coordinate system corresponding to the unified numbering system includes a rack, column, and row axis. Each rack 602 structure in the warehouse may be enumerated, each rack is further divided into columns and rows. A column 606A, 606B (collectively referred to as 606) may refer to a single vertical position of a pallet, while the row 604A, 604B (collectively referred to as 604) may refer to the horizontal shelf of the rack. While the rack structure in the embodiment illustrated by FIG. 6A includes two columns 606A, 606B per rack, in other embodiments, the rack structure may include more or fewer columns per rack. A location coordinate formatted based on the unified numbering system may be ordered in a rack-column-row sequence. For example, a rack 602 structure may include two columns 606 and two rows 604. As such, the location coordinate of a storage location (e.g., pallet location) may be presented as "1-2-2", which indicates the storage location is in column "2" of rack "1"

and on a row "2". In some embodiments, the columns may be enumerated in increasing order from left side of the rack structure to right. In other embodiments, the columns may be enumerated in increasing order from right side of the rack structure to the left.

Figure 6B:
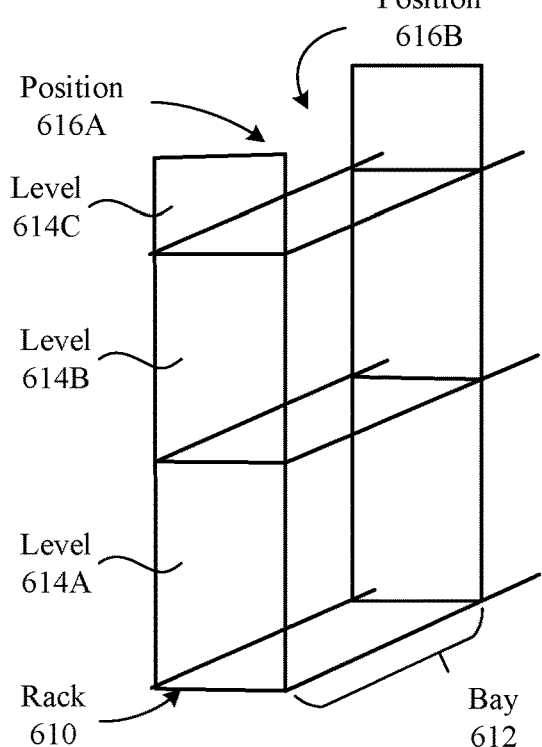
FIG. 6B is a conceptual diagram illustrating a rack structure labeled according to a rack-bay-level-position numbering system, according to an embodiment.

FIG. 6B is a conceptual diagram illustrating a rack structure labeled according to a rack-bay-level-position numbering system, according to an embodiment. The rack-bay-level-position location numbering system may use numerical or alphabetical designations to identify a specific pallet location. The coordinate system corresponding to the rack-bay-level-position numbering system includes a rack, bay, level, and position axis. The rack 610 structures in the warehouse may be enumerated. The bay 612 may refer to an area between two upright supports of a rack, and each bay 612 may contain more than one levels and more than one positions. While the level 614A, 614B (collectively referred to as 614) may refer to a horizontal shelf of a rack and may be alphabetized. The position 616A, 616B (collectively referred to as 616) may refer to a pallet location on a shelf of the rack 610 structure. In the embodiment illustrated by FIG. 6B, the rack 610 structure contains two pallet positions 616 on each shelf. For example, position 616A is adjacent to position 616B on level 614C. In other embodiments, the rack 610 structure may include a different number of pallet positions per shelf, and a different number of levels per rack.

The numbering system converter may analyze the first set of location coordinates which are formatted based on the rack-bay-level-position numbering system to determine an appropriate conversion algorithm that is configured to translate the first set of location coordinates to a second set of location coordinates based on the unified numbering system. In an embodiment where there are two possible pallet positions on each level in a bay, the conversion algorithm may translate the location coordinates with a rack-bay-level-position format to a rack-column-row format using the equations presented below.

$$Rack_{unified} = Rack_{RBLP}$$

$$Column_{unified} = (Bay_{RBLP} - 1) * Number of pallets in Bay + Position_{RBLP}$$

$$Row_{unified} = Level_{RBLP}\{A = 1, B = 2, C = 3, ...\}$$

The rack coordinate value of the rack-bay-level-position coordinate system is equivalent to the rack coordinate value of the rack-column-row coordinate system. Similarly, the row coordinate value of the rack-column-row format is equivalent to enumerating the level coordinate value of the rack-bay-level-position format. The column coordinate value of the unified numbering system may be determined using the bay number, the number of pallet positions on each level in a bay, and position number of the rack-bay-level-position format. For example, a location coordinate represented by "2-2-C-2" having the rack-bay-level-position format can be converted to a location coordinate represented by "2-4-3" having the rack-column-row format. In another example, a location coordinate represented by "1-3-B-1" can be converted to a location coordinate "1-5-2".

Figure 6C:
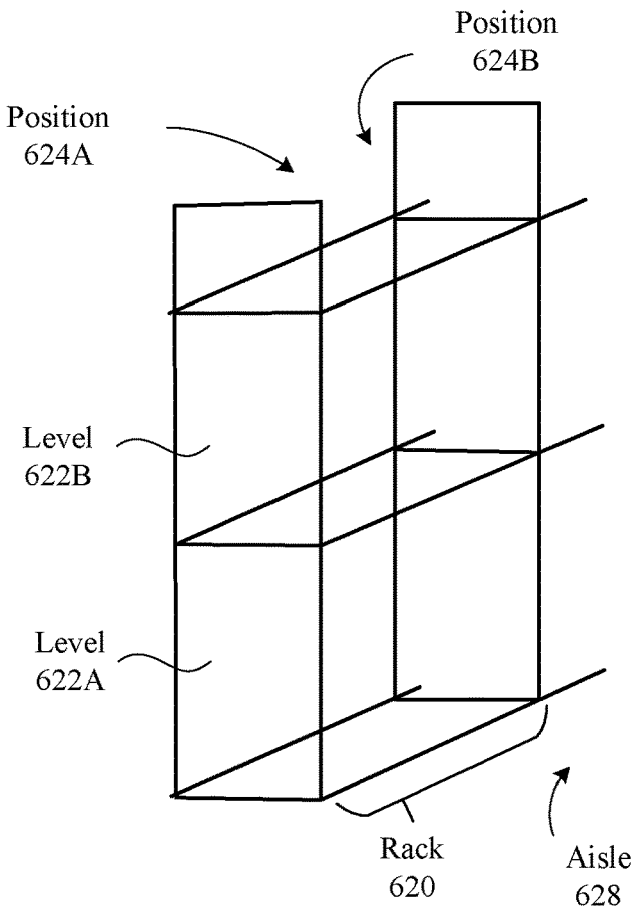
FIG. 6C is a conceptual diagram illustrating a rack structure labeled according to an aisle-rack-level-position numbering system, according to an embodiment.

FIG. 6C is a conceptual diagram illustrating a rack structure labeled according to an aisle-rack-level-position numbering system, according to an embodiment. The aisle-rack-level-position location numbering system may use numerical or directional designations to identify a specific pallet location. The coordinate system corresponding to the aisle-rack-level-position numbering system includes an aisle, rack, level, and position axis. The aisle 628 may refer to a pathway that runs parallel to the rack structures and may be enumerated in a warehouse. The rack may refer to an area between two upright supports of a rack, and each rack 620 may be designated as "left" or "right" with respect to the aisle. For example, in an embodiment with two racks, one rack on each side of an aisle, the rack on the left with respect to the aisle may be designated the "left" rack while the rack on the right with respect to the aisle may be designated the "right" rack. The level 622A, 622B (collectively referred to as 622) may refer to a horizontal shelf of a rack and may be enumerated. The position 624A, 624B (collectively referred to as 624) may refer to a pallet location on a shelf of the rack 620 structure. In other embodiments, the aisle-rack-level-position numbering system may be referred to as an aisle-section-level-position numbering system. The section coordinate value of the aisle-rack-level-position numbering system may refer to an area between two upright supports of a rack structure. In the embodiment illustrated by FIG. 6C, the rack 620 structure contains two pallet positions on each shelf 616.

The numbering system converter may analyze the first set of location coordinates which are formatted based on the aisle-rack-level-position numbering system to determine an appropriate conversion algorithm that is configured to translate the first set of location coordinates to a second set of location coordinates based on the unified numbering system. The conversion algorithm may translate the location coordinates with the aisle-rack-level-position format to a rack-column-row format using the equations presented below.

$$Rack_{unified} = (Aisle_{ARLP} - 1) * 2 + \{Left = 1, Right = 2\}$$

$$Column_{unified} = Position_{ARLP}$$

$$Row_{unified} = Level_{ARLP}$$

The rack coordinate value of the aisle-rack-level-position format may be determined using the aisle number and assigning a numerical value to the directional designation. The column coordinate value of the rack-column-row format may be equivalent to the position coordinate value of the aisle-rack-level-position format. The row coordinate value of the rack-column-row format may be equivalent to the level coordinate value of the aisle-rack-level-position format. For example, a location coordinate with an aisle-rack-level-position format represented by "1-Right-5-10" can be converted to a location coordinate with a rack-column-row format represented by "2-10-5". In another example, a location coordinate represented by "2-Right-3-7" can be converted to a location coordinate "4-7-3".

Figure 6D:
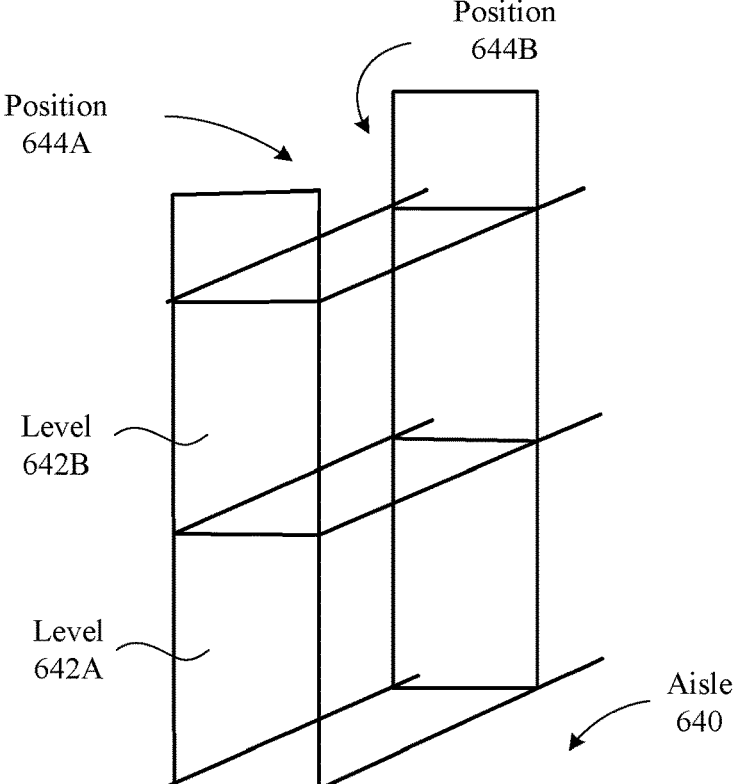
FIG. 6D is a conceptual diagram illustrating a rack structure labeled according to an aisle-position-level numbering system, according to an embodiment.

FIG. 6D is a conceptual diagram illustrating a rack structure labeled according to an aisle-position-level numbering system, according to an embodiment. The aisle-position-level location numbering system may use numerical or alphabetical designations to identify a specific pallet location. The coordinate system corresponding to the aisle-position-level numbering system includes an aisle, position, and level axis. The aisle 640 may refer to a pathway that runs parallel to the rack structures and may be alphabetized in a warehouse. The level 642A, 642B (collectively referred to as 642) may refer to a horizontal shelf of a rack and may be alphabetized. The position 644A, 644B (collectively referred to as 644) may refer to a specific pallet location on a level of the rack structure. In the embodiment illustrated by FIG. 6D, the rack structure contains two pallet positions 644 on each level 642.

The numbering system converter may analyze the first set of location coordinates which are formatted based on the aisle-position-level numbering system to determine an appropriate conversion algorithm that is configured to translate the first set of location coordinates to a second set of location coordinates based on the unified numbering system. The conversion algorithm may translate the location coordinates with the aisle-position-level format to a rack-column-row format using the equations presented below.

$$Rack_{unified} = (Aisle_{APL}\{A = 1, B = 2, \ldots\} - 1) * 2 + \{Left = 1, Right = 2\}$$

$$Column_{unified} = \frac{Position_{APL}}{2} + Position_{APL} \% 2$$

$$Row_{unified} = Level_{APL}\{A = 1, B = 2, C = 3, \ldots\}$$

The rack coordinate value of the rack-column-row coordinate system may be determined using the aisle number of the aisle-position-level format. The column coordinate value of the rack-column-row coordinate system may be determined using the position coordinate value of the aisle-position-level coordinate system. The row coordinate value of the rack-column-row coordinate system may be determined by assigning a numerical value to the alphabetical value of the level coordinate value. For example, if an odd position number represents the position on the left rack and an even position number represents the position on the right rack in the aisle, a location coordinate with an aisle-position-level format represented by "A-001-A" can be converted to a location coordinate with a rack-column-row format represented by "1-1-1". In another example, a location coordinate represented by "B-005-F" can be converted to a location coordinate "3-3-6".

Figure 6E:
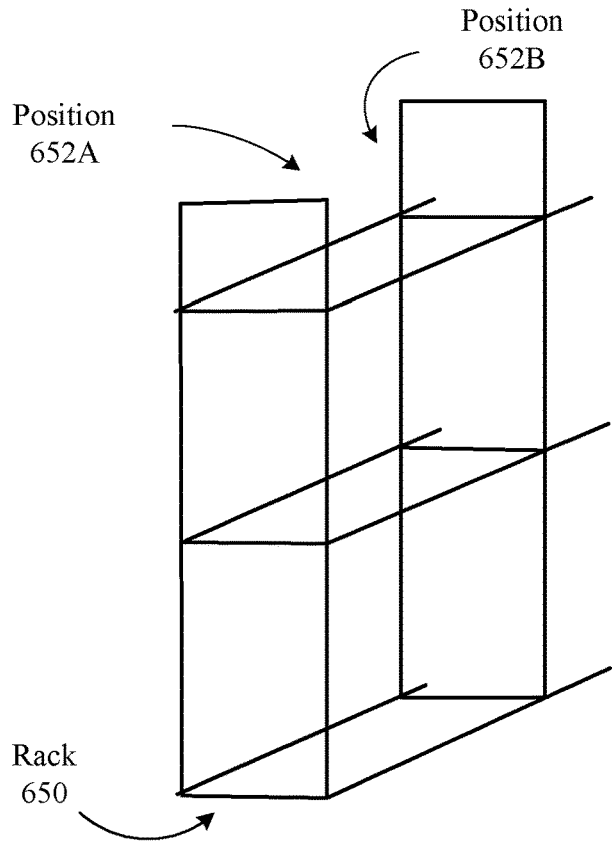
FIG. 6E is a conceptual diagram illustrating a rack structure labeled according to a coordinate system based on a rack and position format, according to an embodiment.

FIG. 6E is a conceptual diagram illustrating a rack structure labeled according to a coordinate system based on a rack and position format, according to an embodiment. The rack-position location numbering system may use numerical or alphabetical designations to identify a specific pallet location. The coordinate system corresponding to the rack and position numbering system includes a rack and position axis. The rack 650 structures may be alphabetized, while the position 652A, 652B (collectively referred to as 652) may refer to a specific pallet location on the rack structure. In the embodiment illustrated by FIG. 6E, the rack structure includes three levels, and two pallet positions 652 on each level.

The numbering system converter may analyze the first set of location coordinates which are formatted based on the rack-position numbering system to determine an appropriate conversion algorithm that is configured to translate the first set of location coordinates to a second set of location coordinates based on the unified numbering system. In an embodiment where the rack 650 structure includes four levels, the conversion algorithm may translate the location coordinates with the rack-position format to a rack-column-row format using the equations presented below.

$$Rack_{unified} = Rack_{RP}\{A = 1, B = 2, C = 3, \ldots\}$$

$$Column_{unified} = \frac{Position_{RP}}{Level_{RP}} + 1$$

-continued $$Row_{unified} = (Position_{RP} - 1) \% \ Level_{RP} + 1$$

The rack coordinate value of the rack-column-row coordinate system may be determined by assigning a numerical value to the alphabetical value of the rack coordinate value of the rack-position coordinate system. The column coordinate value of the rack-column-row coordinate system may be determined using the position and level coordinate values of the rack-position coordinate system. The row coordinate value of the rack-column-row coordinate system may be determined using the position and level coordinate values of the rack-position coordinate system. For example, a location coordinate with a rack-position format represented by "A-001" can be converted to a location coordinate with a rack-column-row format represented by "1-1-1". In another example, a location coordinate represented by "B-011" can be converted to a location coordinate "2-2-3".

Figure 6F:
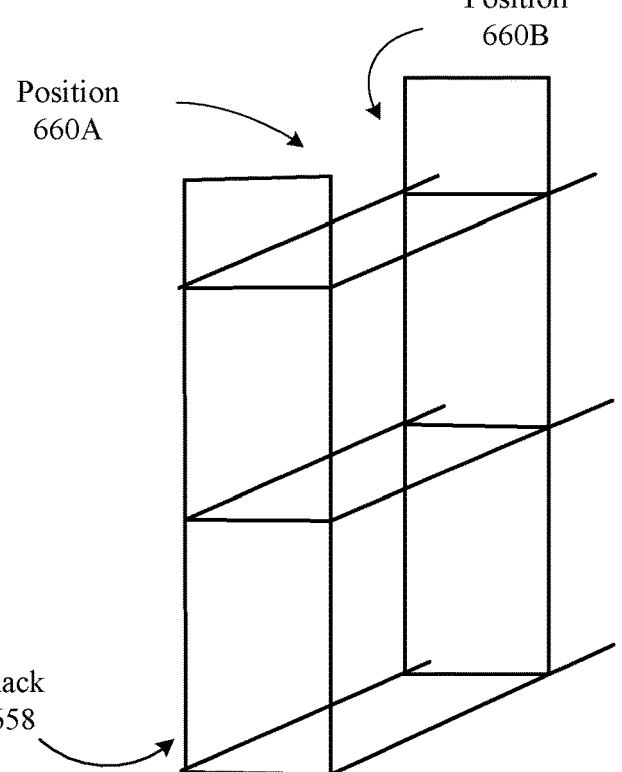
FIG. 6F is a conceptual diagram illustrating a rack structure labeled according to a coordinate system based on a position format, according to an embodiment.

FIG. 6F is a conceptual diagram illustrating a rack structure labeled according to a coordinate system based on a position format, according to an embodiment. The position location numbering system may use sequential numerical designations to identify a specific pallet location. The coordinate system corresponding to the position numbering system includes a position axis. The position 660A, 660B (collectively referred to as 660) may refer to a pallet location on a shelf of the rack 658 structure. In the embodiment illustrated by FIG. 6F, the rack structure contains two pallet positions 660 on each shelf.

The numbering system converter may analyze the first set of location coordinates which are formatted based on the position numbering system to determine an appropriate conversion algorithm that is configured to translate the first set of location coordinates to a second set of location coordinates based on the unified numbering system. In an embodiment where there are four levels and 60 possible pallet positions on each rack 658, the conversion algorithm may translate the location coordinates with a position format to a rack-column-row format using the equations presented below.

The topometric map may be represented by a graph that includes vertices and edges. A vertex 710A, 710B, 710C (collectively referred to as 710) may represent a pallet location or other structural locations. The robot may visit vertices to capture images of inventory or for navigation purposes. Edges 720A, 720B (collectively referred to as 720) may be generated between neighboring vertices and represent traversable paths for the inventory robot. Edges 720 may be generated using a floorplan of the storage site. As such, the topometric map may correspond to the topology of the warehouse and may include metrics that measure precise dimensions of different components in the topology.

Figure 7:
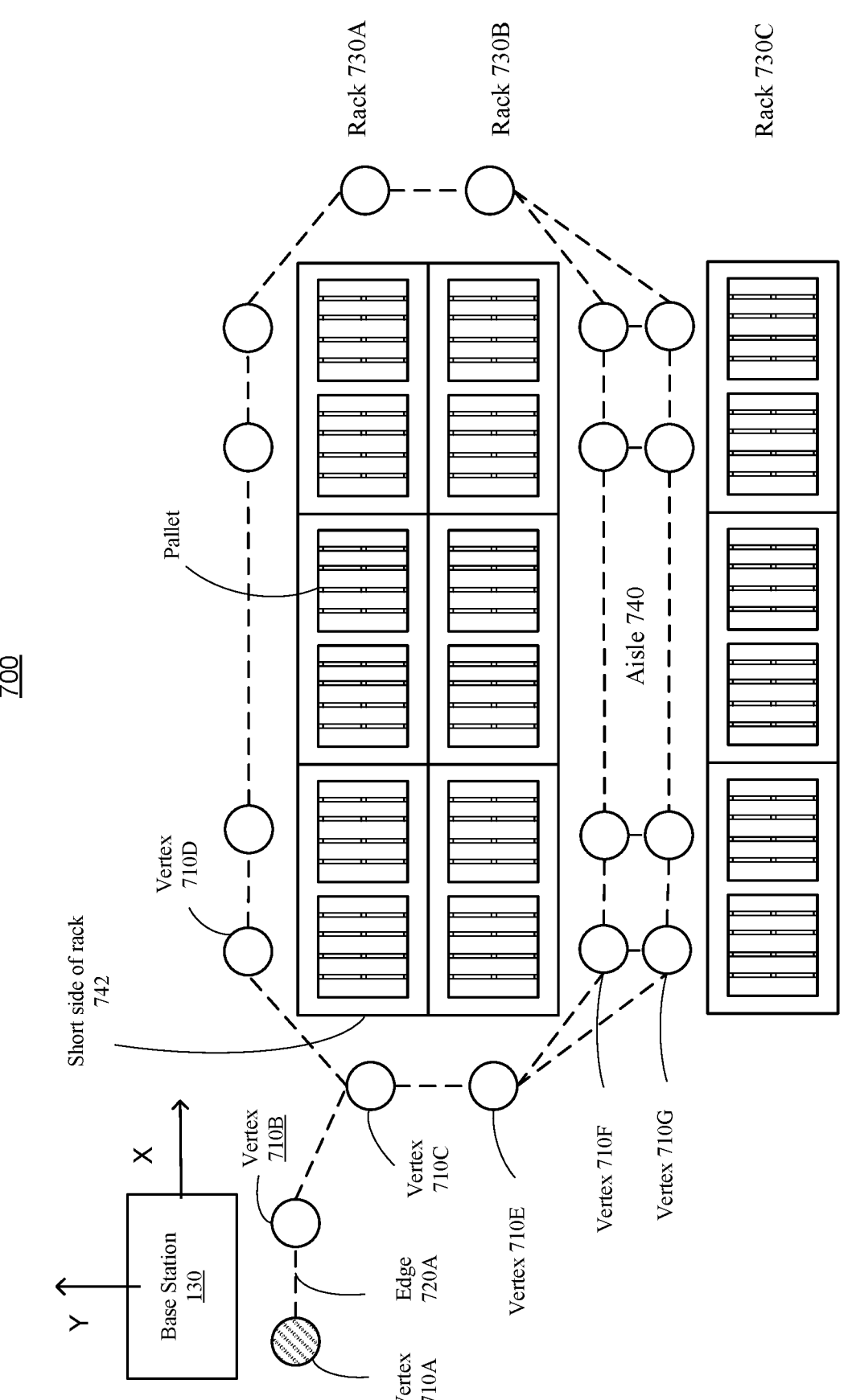
FIG. 7 is a conceptual diagram that illustrates an example visualization of a generated topometric map for a section of a storage facility from a top view, according to an embodiment.

Referring to FIG. 8 in conjunction with FIG. 7, FIG. 8 is a flowchart illustrating a process for generating a topometric map, according to an embodiment. The robotic control system 150 may access 810 the warehouse layout data and the translated set of location coordinates associated with the warehouse to generate an initial version of a topometric map. The warehouse layout data and the second set of location coordinates may be stored in the data storage. As described in FIG. 5, the warehouse layout data may include a top-down layout of the warehouse and a set of location coordinates. The warehouse layout data may further include details related to the rack structures, such as a number of racks, a number of columns and a number of rows in a rack.

The robotic control system 150 may generate 820 vertices of the topometric map based on the warehouse layout data. A vertex may be generated at pallet locations or other structural locations. Some examples of structural locations include, and is not limited to, a location of a base station, a hovering location above the base station, entrances of aisles, destinated turning points, locations of freestanding pallets, sides of racks, frames of racks, and other identifiable locations related to structures or objects, whether the structures or objects are permanent or temporary, regular or irregular, large or small. Each vertex may be labeled with the location coordinate of the vertex. The location coordinate may be from the second set of location coordinates based on the unified numbering system.

The robotic control system 150 may generate 830 edges between neighboring vertices based on the floorplan of the $$Rack_{unified} = \frac{Position_P}{Total \ positions \ per \ rack} + 1$$

$$Column_{unified} = \frac{Position_P - (Rack_{unified} - 1) * Total \ positions \ per \ rack}{Total \ number \ of \ levels} + 1$$

$$Row_{unified} = (Position_P - (Rack_{unified} - 1) * Total \ positions \ per \ rack - 1) \% \ Total \ number \ of \ levels + 1$$

The rack coordinate value of the rack-column-row coordinate system may be determined using the position coordinate value of the position coordinate system. The column and row coordinate value of the rack-column row coordinate system may be determined using the rack coordinate value of the rack-column-row coordinate system, total positions per rack, total number of levels per rack, and position coordinate value of the position coordinate system. For example, a location coordinate with a position format represented by "001" can be converted to a location coordinate with a rack-column-row format represented by "1-1-1". In another example, a location coordinate represented by "067" can be converted to a location coordinate "2-2-3".

FIG. 7 is a conceptual diagram illustrating an example visualization of a generated topometric map for a section of a warehouse from a top view, according to an embodiment.

storage site. An edge indicates a traversable path for the robot between two vertices. For example, an edge may be generated between a vertex 710C located on a short side of a rack 742 and a vertex 710D at the first column of the rack. Vertices located in the same aisle 740 that share the same row and same column of a rack may also be connected. For example, vertex 710F and vertex 710G may be connected through an edge. While edges are oftentimes straight paths between two vertices, one or more edges may also represent other shapes of paths.

The robotic control system 150 may move 840 the aerial inventory robot along a path within the warehouse. The robotic control system may direct the inventory robot along a route to conduct a survey of the warehouse and verify the layout of the warehouse, rack structures and storage locations. In some embodiments, whether two vertices are connected through an edge may depend on the survey of the warehouse (e.g., by the robot 120) or based on the warehouse layout data of the storage site 110. For example, if two vertices are separated by an obstacle detected during the survey (e.g., a wall, a rack, a pile of inventory), the two vertices may not be connected through an edge. In other embodiments, the edges may be dynamically adjusted to reflect the situation of the storage site to account for situations such as a temporary blockage of a path.

The inventory robot may measure 850 metric values within the warehouse while the inventory robot moves within the warehouse. The inventory robot may measure or verify metric values at various locations around the warehouse. Vertices 710 and edges 720 may have associated metrics that can be updated while the robot navigates the storage site. Vertices 710 may have different sets of metrics depending on its class. For example, a vertex 710A representing the base station may have a name of a storage site as an assigned vertex metric to match the topometric map to a storage site stored in the robotic control system 150. In another example, a vertex located on a short side of a rack 742 may have metrics such as the vertex's global position within the storage site 110 in terms of the three-dimensional cartesian coordinate system, a depth of the rack at which the vertex is located, and a width of the aisle 740 (e.g., distance between rack 730B and 730C). A vertex located in the aisle 740 facing the pallets may have metrics such as the vertex's global position within the storage site, a beam span, and beam length.

Each edge 720 between a parent and child vertex may have a set of metrics (e.g., four) that represent the coordinates of the vertices. In some embodiments, the use of "parent" and "child" merely implies a pair of vertices, but it does not imply any hierarchy of one vertex over another. In some embodiments, a cartesian coordinate system may be used, although in other embodiments other suitable coordinate systems may also be implemented. Using a cartesian coordinate system as an example, the metrics include, and is not limited to, a translational difference between the parent and child vertex in the three-dimensional cartesian coordinate system (i.e., x, y, and z-axis), and a rotational difference measured about the z-axis from the parent to the child vertex.

The planner 250 of the inventory robot may communicate with the perception engine 205 and state estimator 235 to measure 850 structural features of the rack structures (e.g., beam length and beam span). The planner 250 may use the measurements to assign 860 vertex and edge metrics and instructs the topometric map manager 245 to update the topometric map.

Figure 9:
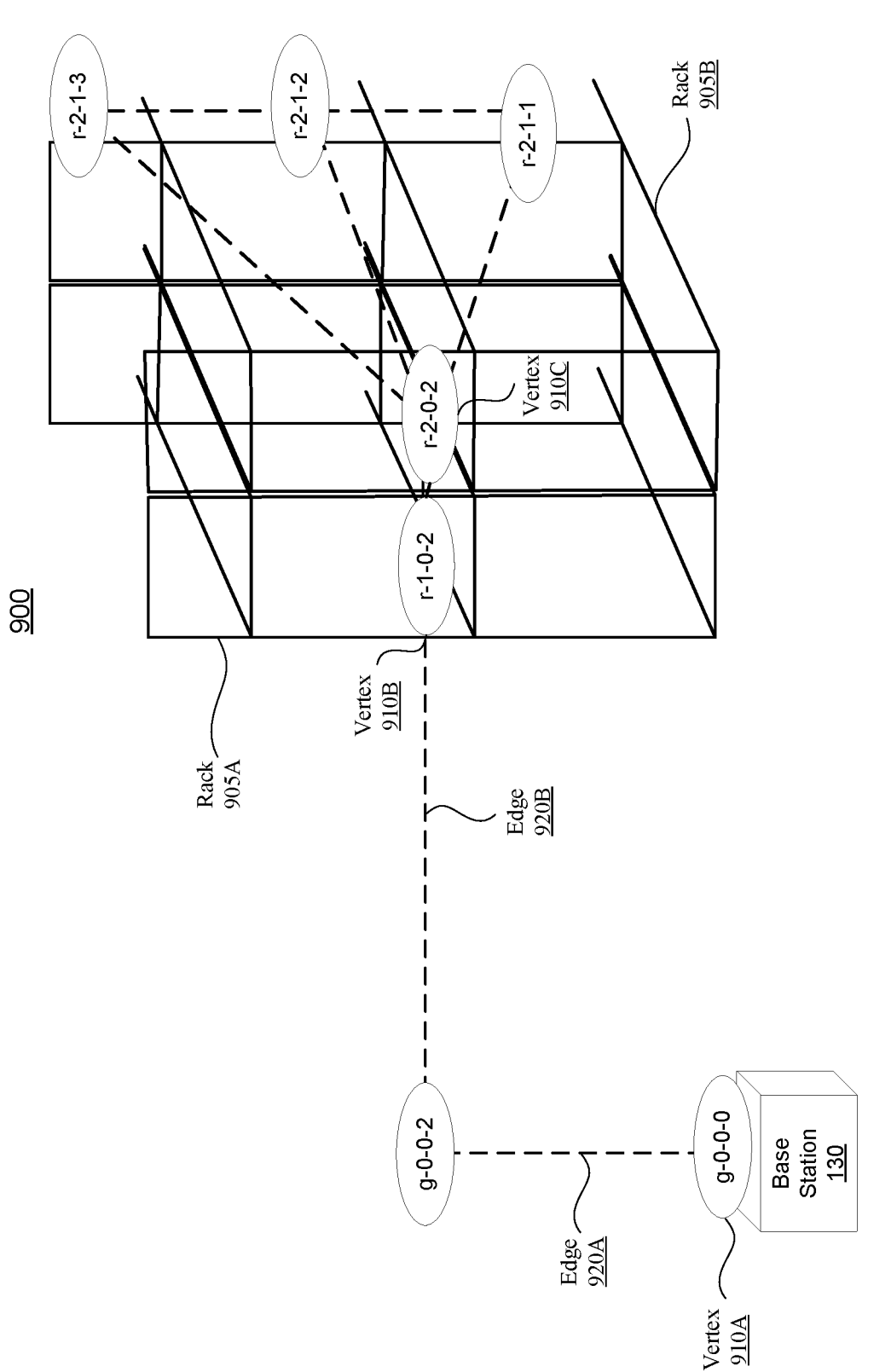
FIG. 9 is a conceptual diagram illustrating an example visualization of a topometric map in a warehouse, according to an embodiment.

FIG. 9 is a conceptual diagram illustrating an example visualization of a topometric map in a warehouse, according to an embodiment. As illustrated, vertices are generated at pallet locations, other storage locations, and navigation locations (e.g., base station 130). The aerial inventory robot may travel to a target vertex through edges 920A, 920B generated between vertices 910. In some embodiments, vertices are labeled using a translated set of location coordinates based on the unified numbering system, which has a rack-column-row format. In other embodiments, the location coordinate may include an additional vertex class parameter value, the vertex class indicating the location of the vertex. Some examples of classes include, and is not limited to, ground/base station, rack stacking, and floor stacking. Vertex classes can be added depending on the storage site configuration. For example, in the embodiment illustrated by FIG. 9, vertex 910A is labeled "g-0-0-0", which indicates that vertex 910A belongs to the ground/base station class. In another example, vertex 910B is labeled "r-1-0-2", which indicates that vertex 910B belongs to the rack stacking class.

Additional Configuration Information

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method for generating a topometric map according to a unified numbering system used to navigate an aerial inventory robot in a warehouse, the computer-implemented method comprising:

receiving, by a robotic control system from a warehouse operator, warehouse layout data of a warehouse, wherein the warehouse layout data includes a first set of location coordinates in a first format that is specific to the warehouse, the first format being one of a plurality of heterogeneous warehouse-specific coordinate systems used across different storage sites, the robotic control system is adapted to process different location coordinate formats of a plurality of warehouses, the first set of location coordinates including coordinates of racks and storage locations, and the coordinates of the racks and storage locations are arranged in a first particular order according to the first format;

analyzing the first particular order of the racks and the storage locations specified in the first format to determine a data position of a storage location relative to a data position of a rack;

selecting, from a plurality of candidate conversion algorithms, a conversion algorithm based on analyzing the first particular order, wherein selecting the conversion algorithm comprises:

matching the first particular order to one of a plurality of stored numbering system templates, and selecting the conversion algorithm associated with the matched template;

translating, using the conversion algorithm, the first set of location coordinates into a second set of location coordinates, wherein the second set of location coordinates are in a second format according to a unified numbering system that is used in topometric navigation;

generating, by the robotic control system, a topometric map of the warehouse based on the second set of location coordinates, the topometric map comprising vertices corresponding to storage locations and edges representing navigable paths for the aerial inventory robot; and causing, by the robotic control system, the aerial inventory robot to navigate along a path defined in the topometric map to a selected storage location in the warehouse.

2. The computer-implemented method of claim 1, wherein the second set of location coordinates in the second format based on the unified numbering system comprises rack, column, and row coordinate values.

3. The computer-implemented method of claim 1, the plurality of candidate conversion algorithms comprising a first conversion algorithm configured to translate the first set of location coordinates in a first format having rack, bay, level, and position coordinate values to a second set of location coordinates in the second format, the first conversion algorithm comprising:

converting the rack coordinate value of the first format to a rack coordinate value of the second format;

converting the bay and position coordinate values of the first format to a column coordinate value of the second format; and converting the level value of the first format to a row value of the second format.

4. The computer-implemented method of claim 1, wherein the plurality of candidate conversion algorithms comprising a second conversion algorithm configured to convert a first set of location coordinates in a first format having aisle, rack, level, and position coordinate values to a second set of location coordinates in the second format, the second conversion algorithm comprising:

converting the aisle and rack coordinate values of the first format to a rack coordinate value of the second format;

converting the position coordinate value of the first format to a column coordinate value of the second format; and converting the level coordinate value of the first format to a row coordinate value of the second format.

5. The computer-implemented method of claim 1, wherein the plurality of candidate conversion algorithms comprising a third conversion algorithm configured to convert a first set of location coordinates in a first set of location coordinates in a rack-bay-level-position format to a second set of location coordinates in a rack-column-row format, the third conversion algorithm comprising:

converting a rack coordinate value of the rack-bay-level-position format to a rack coordinate value of the rack-column-row format;

converting a level coordinate value of the rack-bay-level-position format to a row coordinate value of the rack-column-row format by assigning a numerical value to the level; and converting bay and position coordinate values of the rack-bay-level-position format to a column coordinate value of the rack-column-row format.

6. The computer-implemented method of claim 1, wherein the plurality of candidate conversion algorithms comprising a fourth conversion algorithm configured to convert a first set of location coordinates in an aisle-rack-level-position format and position coordinate values to a second set of location coordinates in a rack-column-row format, the fourth conversion algorithm comprising:

converting aisle and rack side designations of the aisle-rack-level-position format to a rack coordinate value of the rack-column-row format;

converting the position coordinate value to a column coordinate value; and converting a level coordinate value to a row coordinate value.

7. The computer-implemented method of claim 1, wherein the plurality of candidate conversion algorithms comprising a fifth conversion algorithm configured to convert a first set of location coordinates in an aisle-position-level format to a second set of location coordinates in a rack-column-row format, the fifth conversion algorithm comprising:

determining the rack coordinate in the second format using an aisle identifier and an assignment based on whether the position is on a left or right side of the aisle;

converting the position identifier in the first format to a column coordinate by grouping adjacent pallet positions along each aisle; and converting a level identifier in the first format to a row coordinate by assigning a numerical value to a level designation.

8. The computer-implemented method of claim 1, wherein generating the topometric map comprises:

accessing, by the robotic control system, a second set of location coordinates and warehouse layout data corresponding to a warehouse;

generating vertices for pallet locations and structural locations based on warehouse layout data, wherein the vertices are labeled using the second set of location coordinates based on the unified numbering system;

generating edges between neighboring vertices based on warehouse layout data; and moving the aerial inventory robot along a path around the warehouse;

measuring metric values within the warehouse; and assigning metric values to vertices and edges of the topometric map.

9. A non-transitory computer readable medium comprising stored instructions that, when executed by one or more processors, cause the one or more processors to:

receive, by a robotic control system from a warehouse operator, warehouse layout data of a warehouse, wherein the warehouse layout data includes a first set of location coordinates in a first format that is specific to the warehouse, the first format being one of a plurality of heterogeneous warehouse-specific coordinate systems used across different storage sites, the robotic control system is adapted to process different location coordinate formats of a plurality of warehouses, the first set of location coordinates including coordinates of racks and storage locations, and the coordinates of the racks and storage locations are arranged in a first particular order according to the first format;

analyze the first particular order of the racks and the storage locations specified in the first format to determine a data position of a storage location relative to a data position of a rack;

select, from a plurality of candidate conversion algorithms, a conversion algorithm based on analyzing the first particular order, wherein selecting the conversion algorithm comprises:

matching the first particular order to one of a plurality of stored numbering system templates, and selecting the conversion algorithm associated with the matched template;

translate, using the conversion algorithm, the first set of location coordinates into a second set of location coordinates, wherein the second set of location coordinates are in a second format according to a unified numbering system that is used in topometric navigation;

generate, by the robotic control system, a topometric map of the warehouse based on the second set of location coordinates, the topometric map comprising vertices corresponding to storage locations and edges representing navigable paths for an aerial inventory robot; and cause, by the robotic control system, the aerial inventory robot to navigate along a path defined in the topometric map to a selected storage location in the warehouse.

10. The non-transitory computer readable medium of claim 9, wherein the second set of location coordinates in the second format based on the unified numbering system comprises a rack, column, and row parameter values.

11. The non-transitory computer readable medium of claim 9, wherein the plurality of candidate conversion algorithms comprises a first conversion algorithm configured to translate a first set of location coordinates in a first format having rack, bay, level, and position coordinate values to a second set of location coordinates in the second format, the first conversion algorithm comprising instructions that when executed by the one or more processors, cause the computer processor to:

convert the rack coordinate value of the first format to a rack coordinate value of the second format;

convert the bay and position coordinate values of the first format to a column coordinate value of the second format; and convert the level value of the first format to a row value of the second format.

12. The non-transitory computer readable medium of claim 9, wherein the plurality of candidate conversion algorithms comprises a second conversion algorithm configured to convert a first set of location coordinates in a first format having aisle, rack, level, and position coordinate values to a second set of location coordinates in the second format, the second conversion algorithm comprising instructions that when executed by the one or more processors, cause the computer processor to:

convert the aisle and rack coordinate values of the first format to a rack coordinate value of the second format;

convert the position coordinate value of the first format to a column coordinate value of the second format; and convert the level coordinate value of the first format to a row coordinate value of the second format.

13. The non-transitory computer readable medium of claim 9, wherein the plurality of candidate conversion algorithms comprising a third conversion algorithm configured to convert a first set of location coordinates in a first set of location coordinates in a rack-bay-level-position format to a second set of location coordinates in a rack-column-row format, the third conversion algorithm comprising instructions that when executed by the one or more processors, cause the computer processor to:

convert a rack coordinate value of the rack-bay-level-position format to a rack coordinate value of the rack-column-row format;

convert a level coordinate value of the rack-bay-level-position format to a row coordinate value of the rack-column-row format by assigning a numerical value to the level; and convert bay and position coordinate values of the rack-bay-level-position format to a column coordinate value of the rack-column-row format.

14. The non-transitory computer readable medium of claim 9, wherein the plurality of candidate conversion algorithms comprising a fourth conversion algorithm configured to convert a first set of location coordinates in an aisle-rack-level-position format and position coordinate values to a second set of location coordinates in a rack-column-row format, the fourth conversion algorithm comprising instructions that when executed by the one or more processors, cause the computer processor to:

convert aisle and rack side designations of the aisle-rack-level-position format to a rack coordinate value of the rack-column-row format;

convert the position coordinate value to a column coordinate value; and convert a level coordinate value to a row coordinate value.

15. The non-transitory computer readable medium of claim 9, wherein the plurality of candidate conversion algorithms comprising a fifth conversion algorithm configured to convert a first set of location coordinates in an aisle-position-level format to a second set of location coordinates in a rack-column-row format, the fifth conversion algorithm comprising instructions that when executed by the one or more processors, cause the computer processor to:

determine the rack coordinate in the second format using an aisle identifier and an assignment based on whether the position is on a left or right side of the aisle;

convert the position identifier in the first format to a column coordinate by grouping adjacent pallet positions along each aisle; and convert a level identifier in the first format to a row coordinate by assigning a numerical value to a level designation.

16. The non-transitory computer readable medium of claim 9, wherein the instructions to generate the topometric map further comprises stored instructions that when executed by the one or more processors, cause the computer processor to:

access, by the robotic control system, a second set of location coordinates and warehouse layout data corresponding to a warehouse;

generate vertices for pallet locations and structural locations based on warehouse layout data, wherein the vertices are labeled using the second set of location coordinates based on the unified numbering system;

generate edges between neighboring vertices based on warehouse layout data; and move the aerial inventory robot along a path around the warehouse;

measure metric values within the warehouse; and assign metric values to vertices and edges of the topometric map.

17. A computer system comprising:

a robotic control system configured to:

receive, by a robotic control system from a warehouse operator, warehouse layout data of a warehouse, wherein the warehouse layout data includes a first set of location coordinates in a first format that is specific to the warehouse, the first format being one of a plurality of heterogeneous warehouse-specific coordinate systems used across different storage sites, the robotic control system is adapted to process different location coordinate formats of a plurality of warehouses, the first set of location coordinates including coordinates of racks and storage locations, and the coordinates of the racks and storage locations are arranged in a first particular order according to the first format;

analyze the first particular order of the racks and the storage locations specified in the first format to determine a data position of a storage location relative to a data position of a rack;

select, from a plurality of candidate conversion algorithms, a conversion algorithm based on analyzing the first particular order, wherein selecting the conversion algorithm comprises:

matching the first particular order to one of a plurality of stored numbering system templates, and selecting the conversion algorithm associated with the matched template;

translate a first set of location coordinates to a second set of location coordinates using one of a plurality of candidate conversion algorithms, the second set of location coordinates having a second format according to a unified numbering system, wherein the second set of location coordinates are used to generate a topometric map used to navigate an aerial inventory robot within a warehouse; and generate, by the robotic control system, a topometric map of the warehouse based on the second set of location coordinates, the topometric map comprising vertices corresponding to storage locations and edges representing navigable paths for the aerial inventory robot; and the aerial inventory robot in communication with the robotic control system, the inventory robot configured to:

move along a path within the warehouse;

measure, with a camera module, metric values within the warehouse, wherein the metric values are associated with vertices and edges of the topometric map; and assign metric values to vertices and edges of the topometric map.

18. The computer system of claim 17, wherein the second set of location coordinates in the second format based on the unified numbering system comprises rack, column, and row coordinate values.

19. The computer system of claim 17, wherein the plurality of candidate conversion algorithms comprises a first conversion algorithm configured to translate a first set of location coordinates in a first format having rack, bay, level, and position coordinate values to a second set of location coordinates in the second format, the first conversion algorithm comprising instructions to:

convert the rack coordinate value of the first format to a rack coordinate value of the second format;

convert the bay and position coordinate values of the first format to a column coordinate value of the second format; and convert the level value of the first format to a row value of the second format.

20. The computer system of claim 17, wherein the plurality of candidate conversion algorithms comprising a third conversion algorithm configured to convert a first set of location coordinates in a first set of location coordinates in a rack-bay-level-position format to a second set of location coordinates in a rack-column-row format, the third conversion algorithm comprising instructions to:

convert a rack coordinate value of the rack-bay-level-position format to a rack coordinate value of the rack-column-row format;

convert a level coordinate value of the rack-bay-level-position format to a row coordinate value of the rack-column-row format by assigning a numerical value to the level; and convert bay and position coordinate values of the rack-bay-level-position format to a column coordinate value of the rack-column-row format.

* * * * *